Dec. 5, 1939.   J. R. PEIRCE   2,182,001
ACCOUNTING MACHINE
Filed Sept. 21, 1934   30 Sheets-Sheet 1

Inventor
JOHN R. PEIRCE, Deceased,
By A.C.MABY & T.A.GAVIN, Executors.
By Attorney
A.C.Maby Dec. 5, 1939.  J. R. PEIRCE  2,182,001
ACCOUNTING MACHINE
Filed Sept. 21, 1934   30 Sheets-Sheet 3

Inventor
JOHN R. PEIRCE, Deceased,
By A.C.MABY & T.A.GAVIN, Executors.
By Attorney Dec. 5, 1939.  J. R. PEIRCE  2,182,001
ACCOUNTING MACHINE
Filed Sept. 21, 1934  30 Sheets-Sheet 4
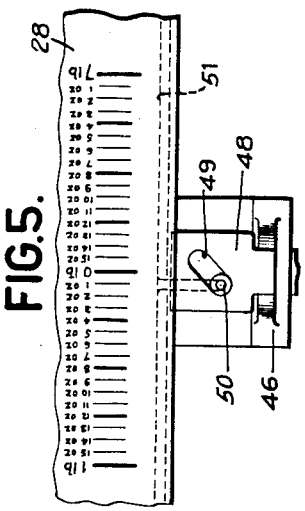
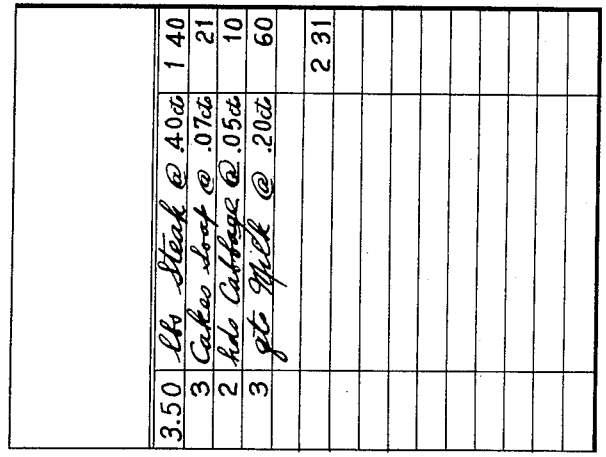
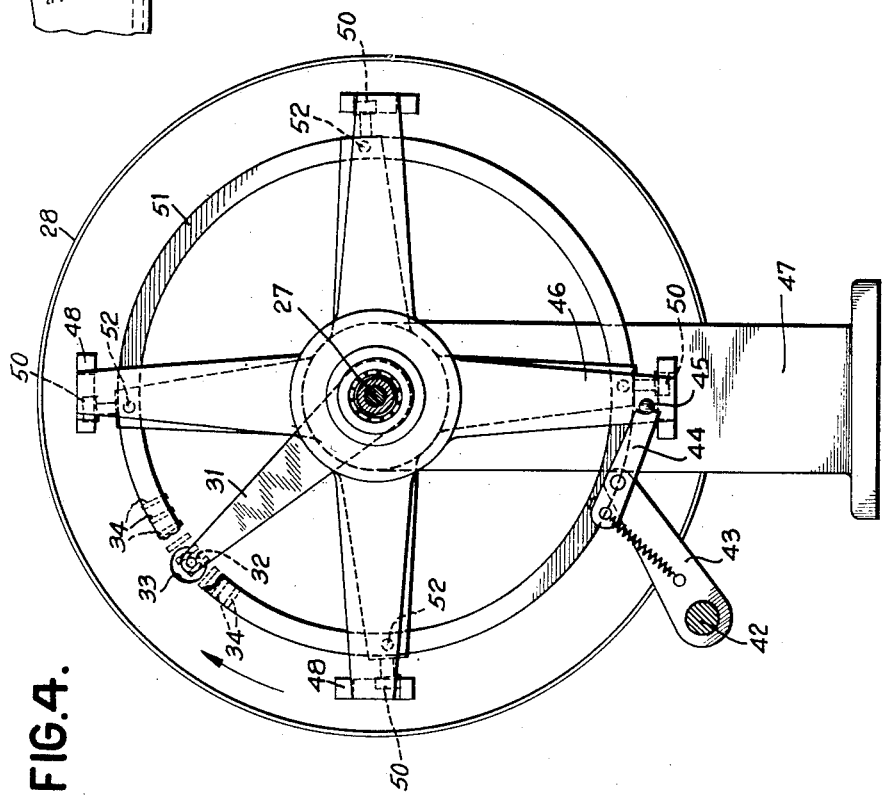
Inventor
JOHN R. PEIRCE, Deceased
By A.C.MABY & T.A.GAVIN, Executors.
By Attorney
A.C.Maby Dec. 5, 1939.   J. R. PEIRCE   2,182,001
ACCOUNTING MACHINE
Filed Sept. 21, 1934   30 Sheets-Sheet 5

FIG.7.

INVENTOR
JOHN R. PEIRCE,
Deceased, By
A. C. MABY &
T. A. GAVIN, Executors.

BY A.C.Maby
ATTORNEY

Dec. 5, 1939.  J. R. PEIRCE  2,182,001
ACCOUNTING MACHINE
Filed Sept. 21, 1934  30 Sheets-Sheet 6
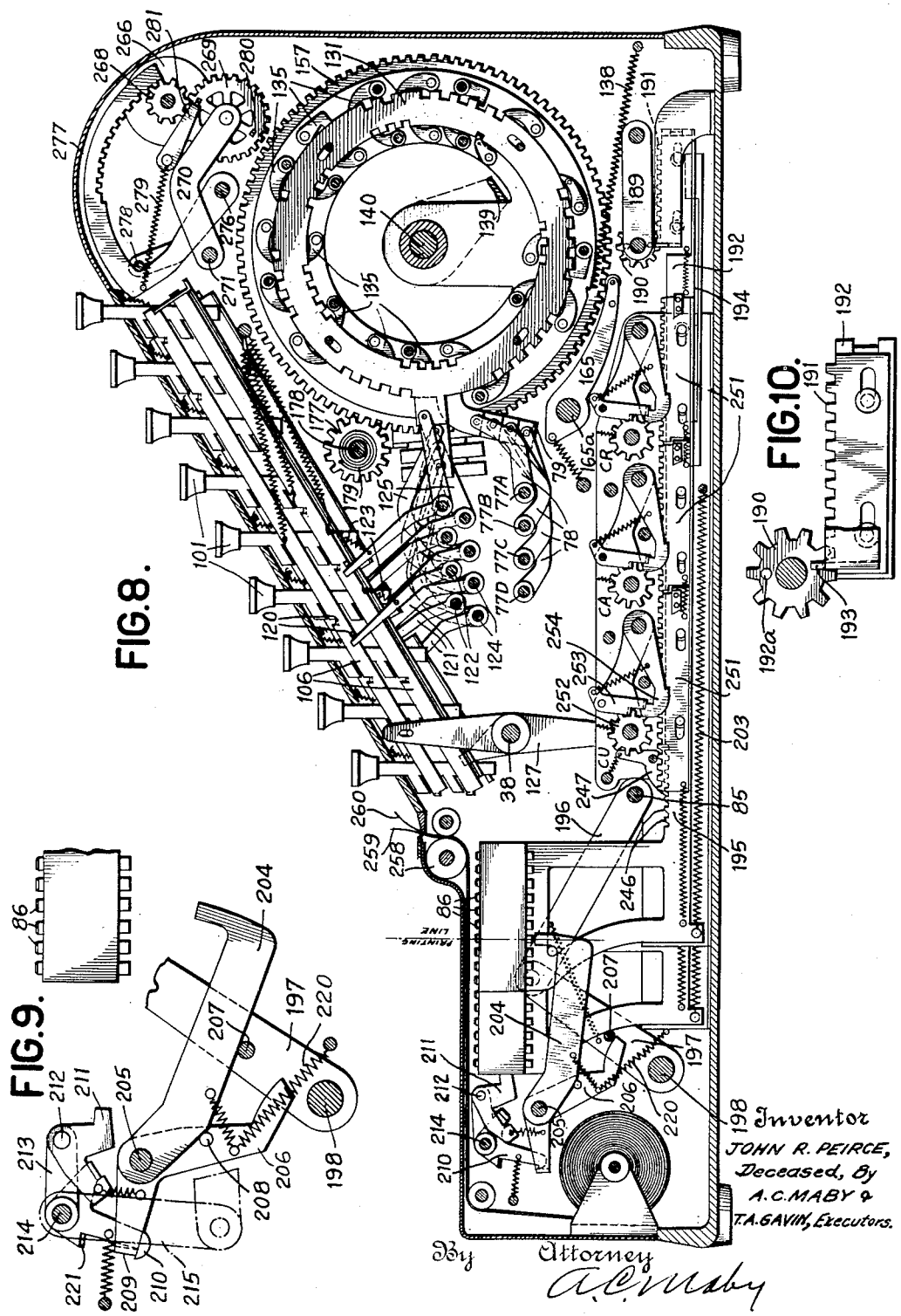

Dec. 5, 1939.                J. R. PEIRCE                 2,182,001
                          ACCOUNTING MACHINE
               Filed Sept. 21, 1934        30 Sheets-Sheet 7
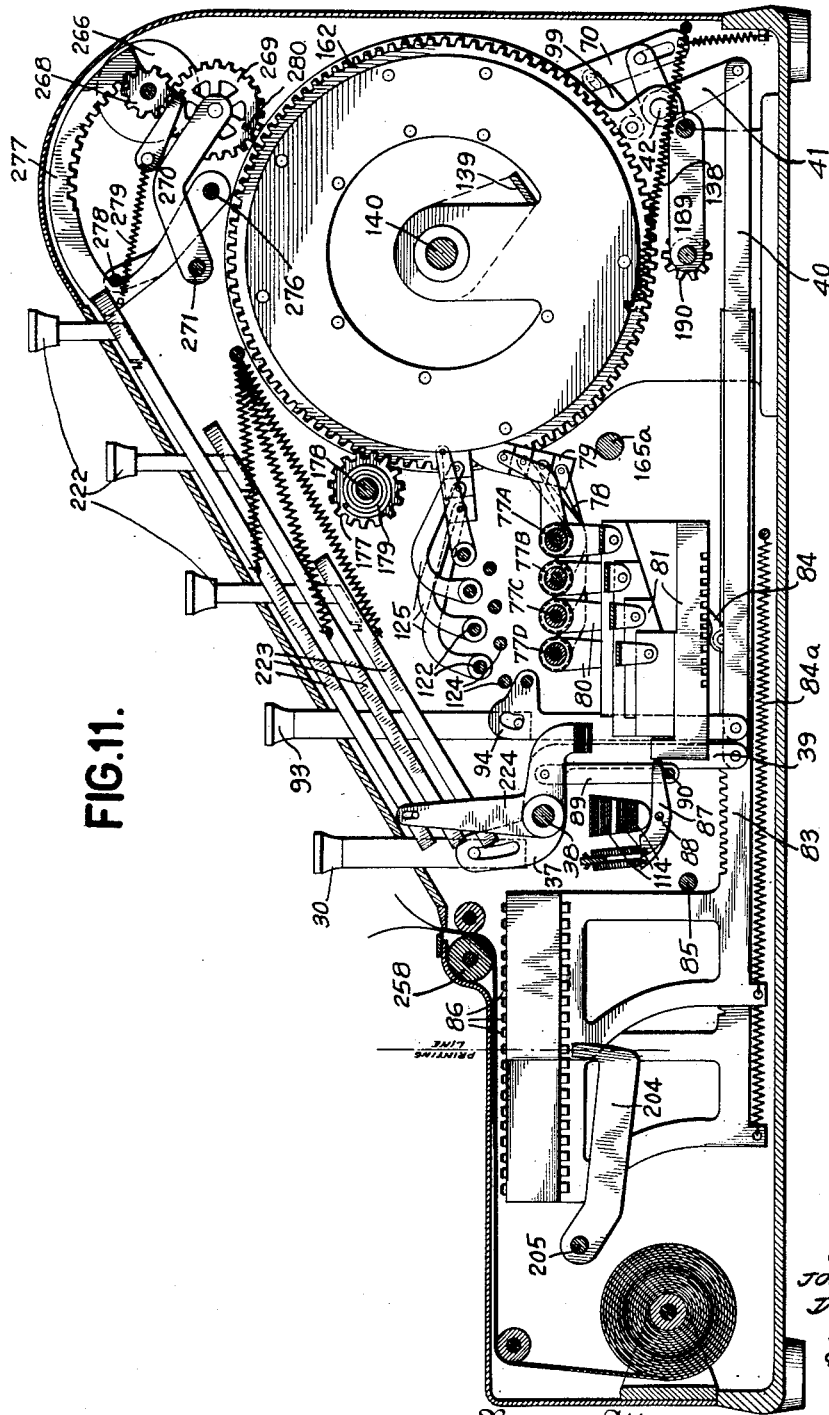

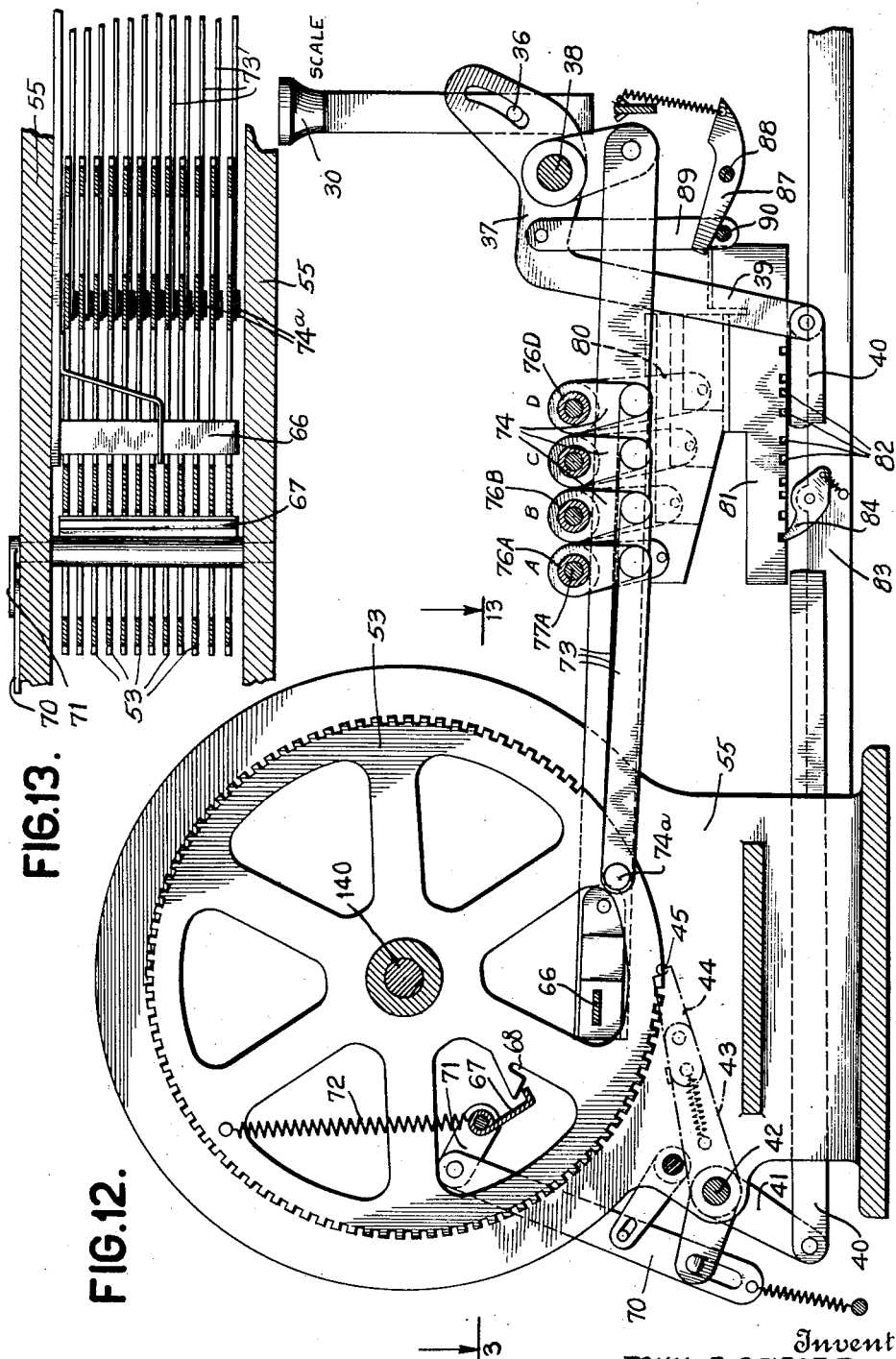

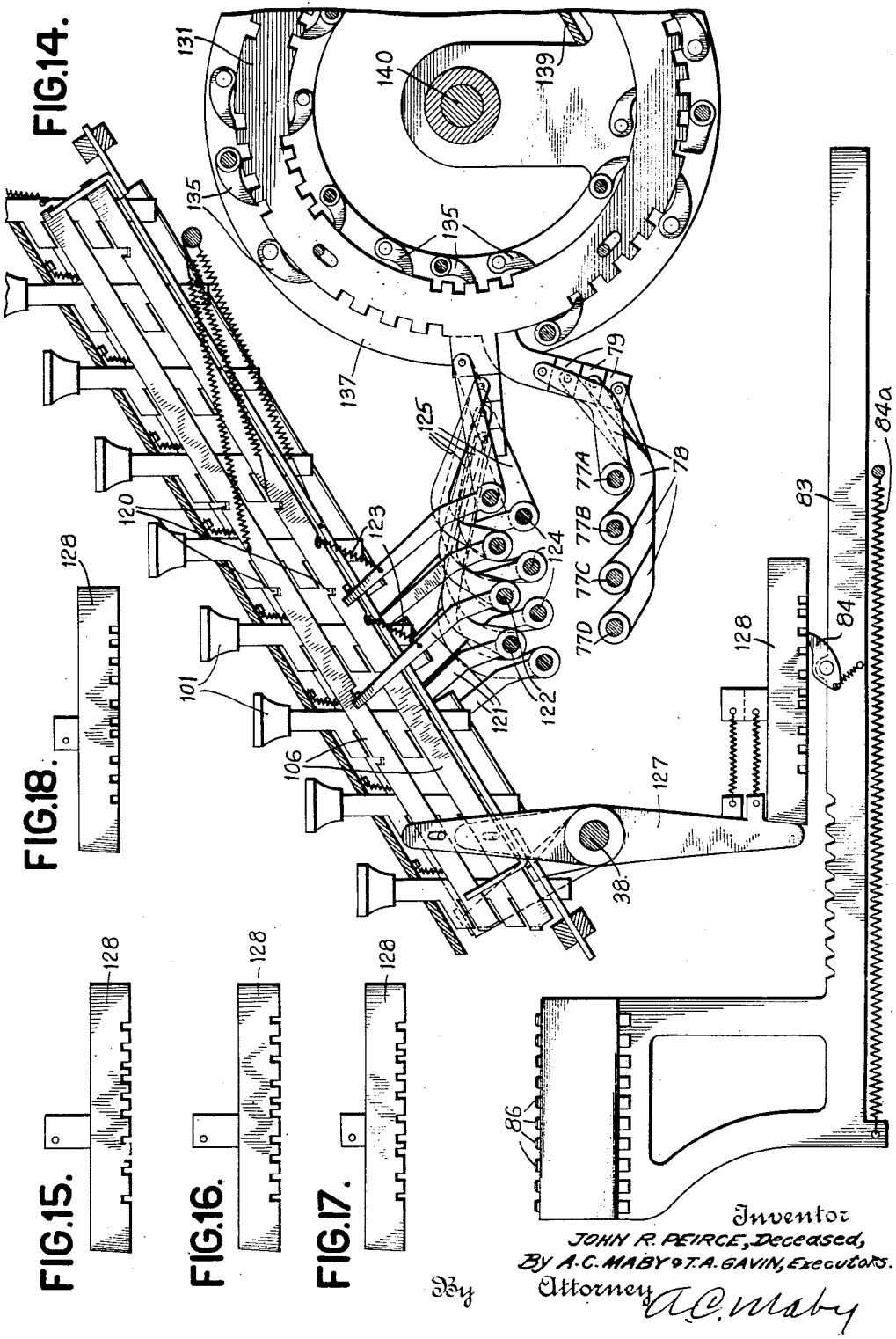

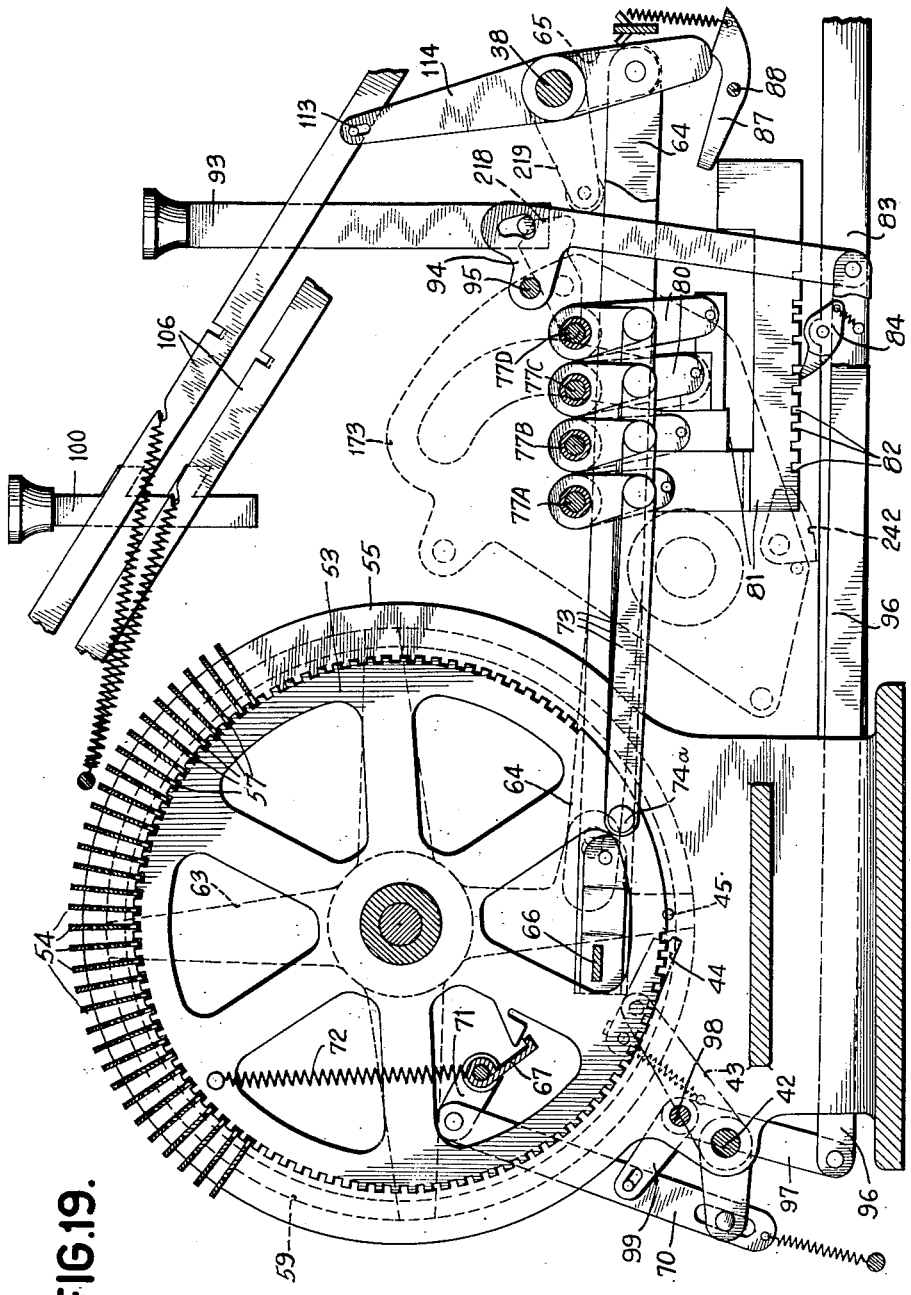

Dec. 5, 1939.  J. R. PEIRCE  2,182,001
ACCOUNTING MACHINE
Filed Sept. 21, 1934  30 Sheets-Sheet 11

Inventor
JOHN R. PEIRCE, Deceased,
By A.C.MABY & T.A.GAVIN, Executors.
By Attorney E.C. Maby Dec. 5, 1939.  J. R. PEIRCE  2,182,001
ACCOUNTING MACHINE
Filed Sept. 21, 1934  30 Sheets-Sheet 12
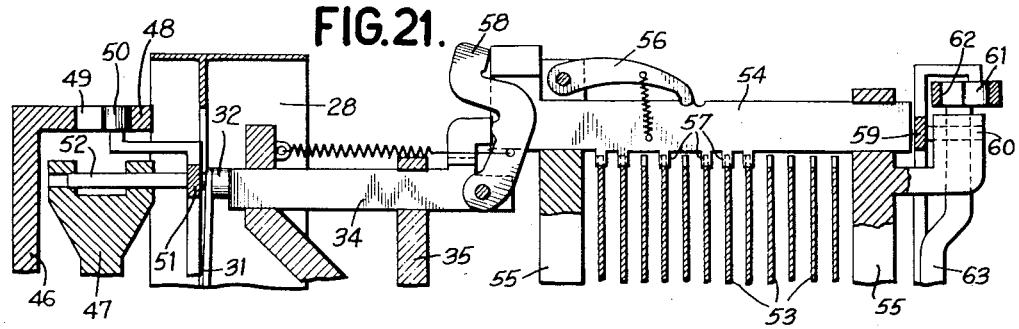
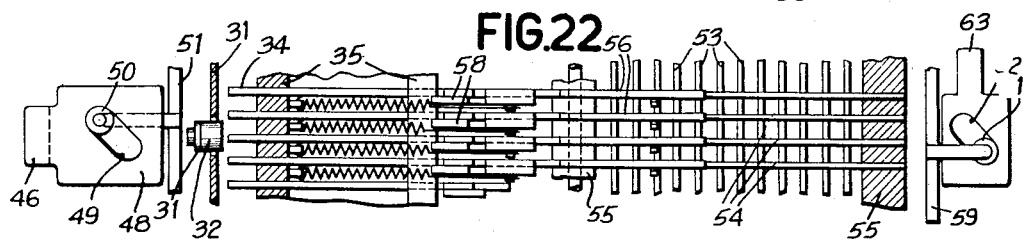
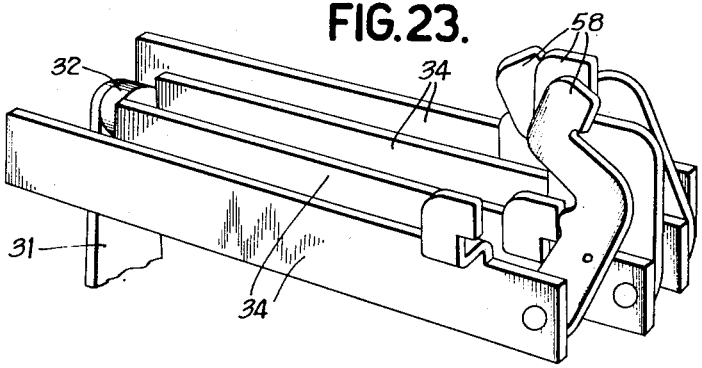
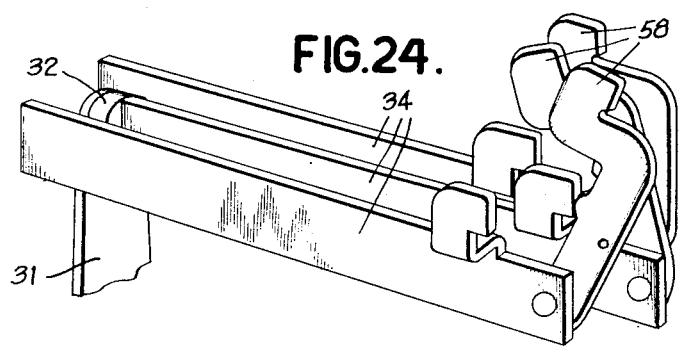
INVENTOR-
JOHN R. PEIRCE, Deceased,
By A.C.MABY & T.A.GAVIN, Executors.
BY
ATTORNEY INVENTOR
JOHN R. PEIRCE, Deceased,
By A.C. MABY &
T.A. GAVIN, Executors
BY
ATTORNEY Dec. 5, 1939.  J. R. PEIRCE  2,182,001
ACCOUNTING MACHINE
Filed Sept. 21, 1934  30 Sheets-Sheet 16
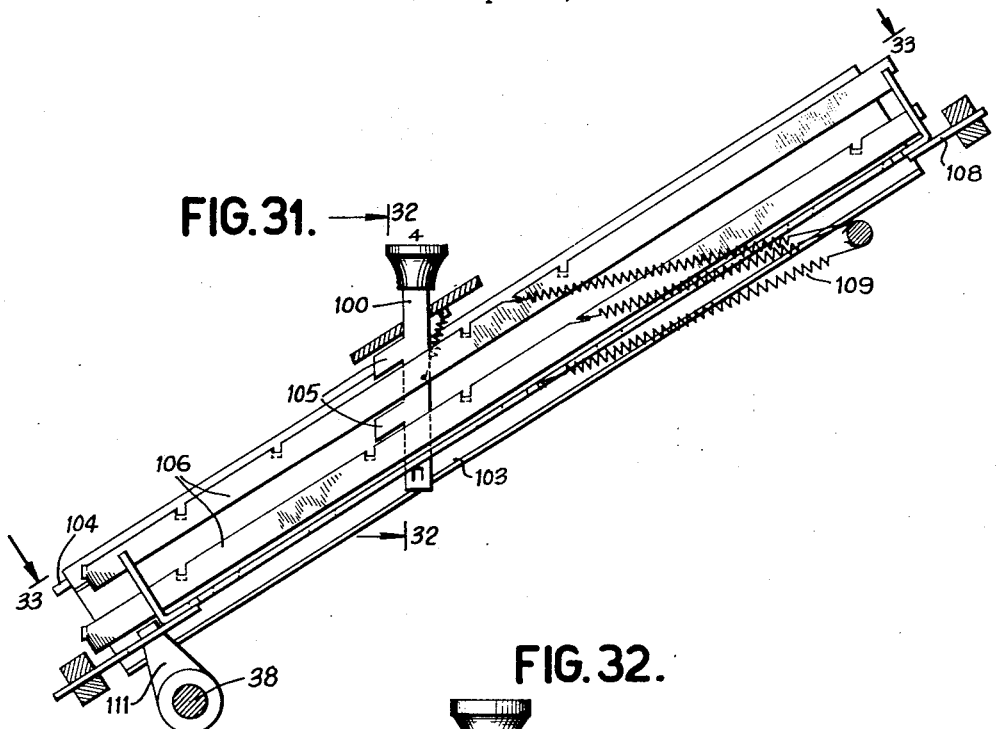
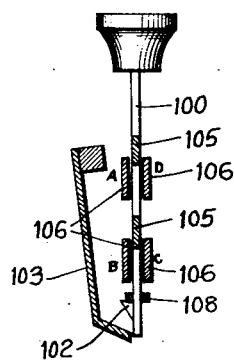
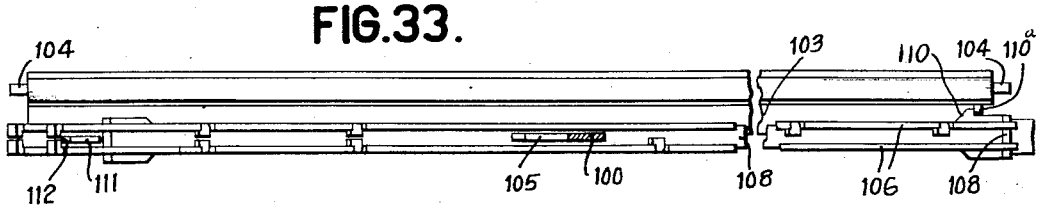
INVENTOR-
JOHN R. PEIRCE, Deceased
By A.C.MABY & T.A.GAVIN, Executors.
BY
ATTORNEY-

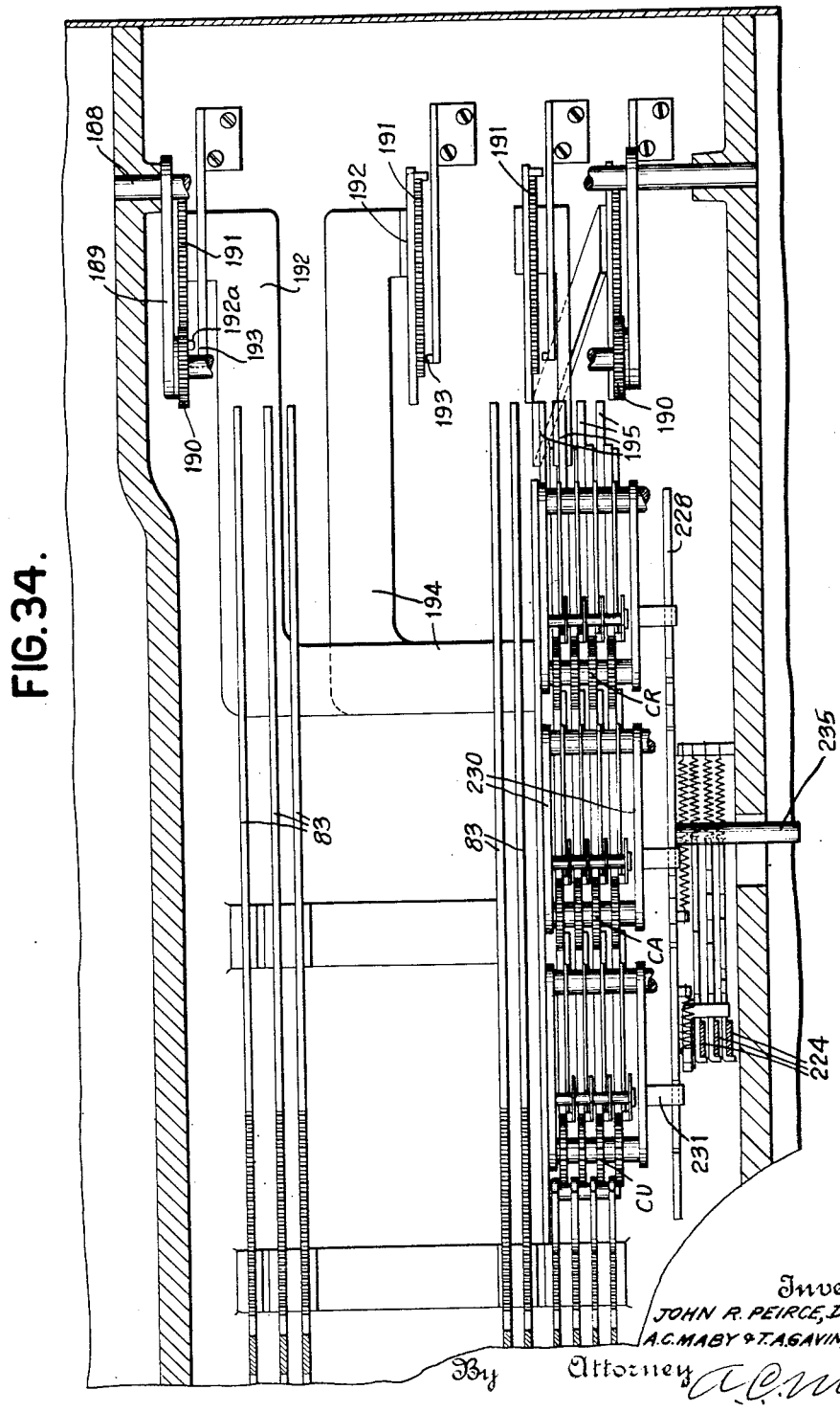

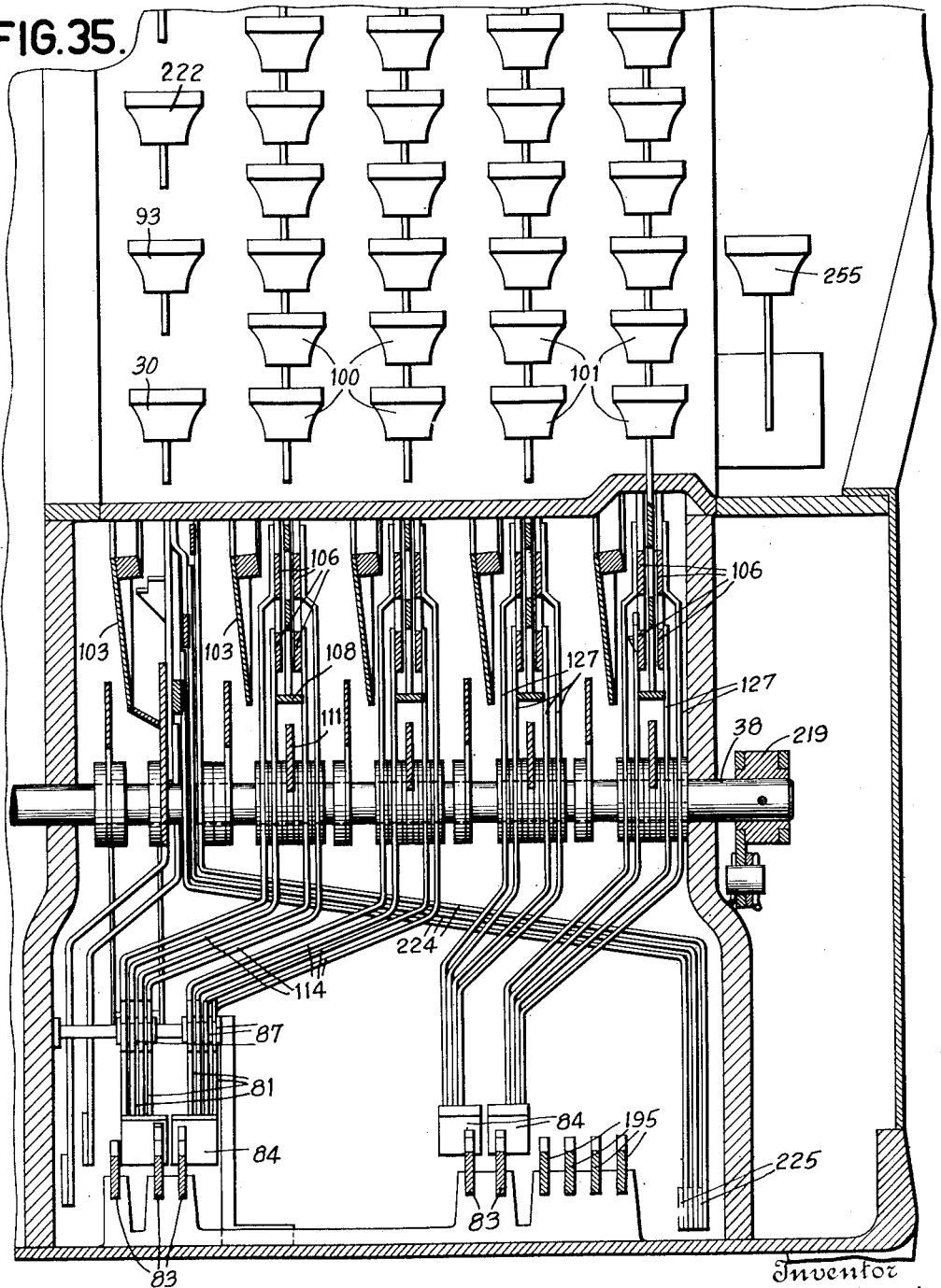

Dec. 5, 1939.  J. R. PEIRCE  2,182,001
ACCOUNTING MACHINE
Filed Sept. 21, 1934  30 Sheets-Sheet 19
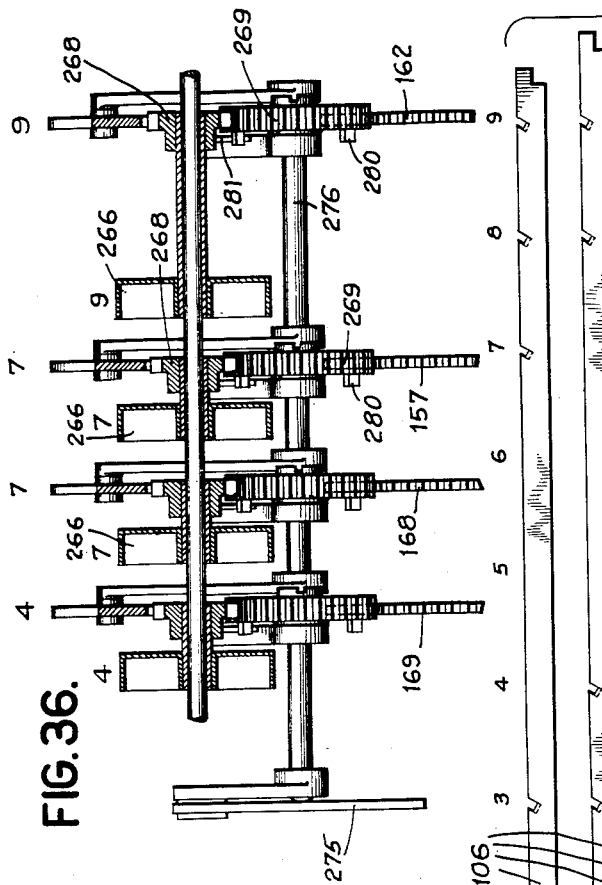
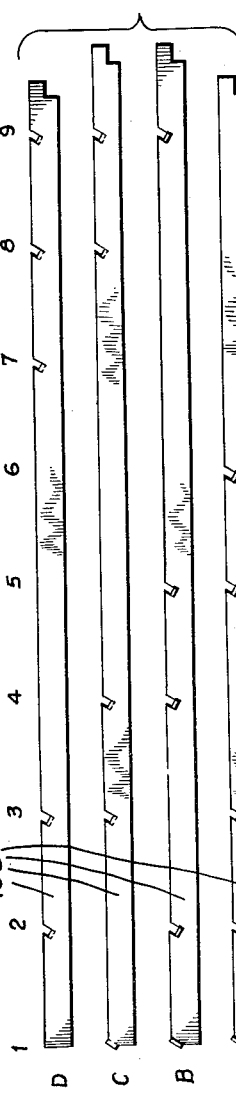
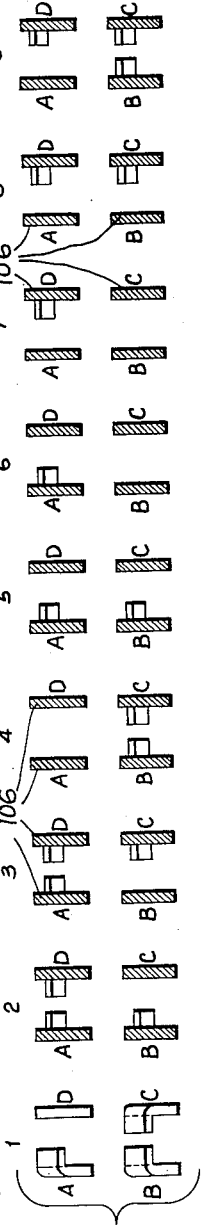
Inventor
JOHN R. PEIRCE, Deceased,
By A.C.MABY & T.A.GAVIN, Executors.
By Attorney Dec. 5, 1939.  J. R. PEIRCE  2,182,001
ACCOUNTING MACHINE
Filed Sept. 21, 1934  30 Sheets-Sheet 20
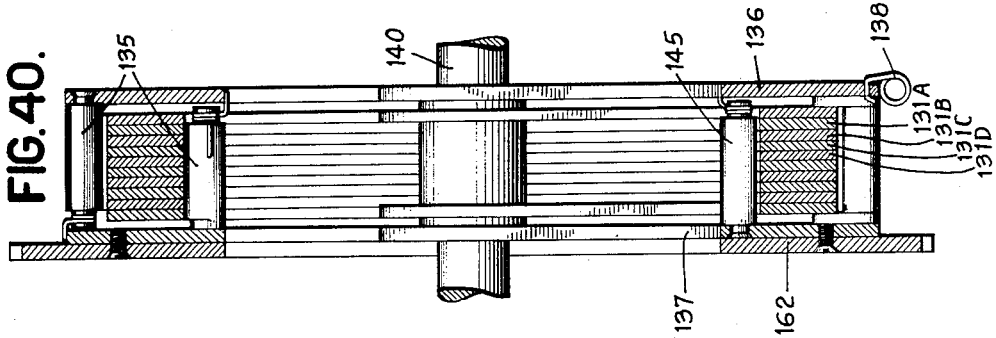
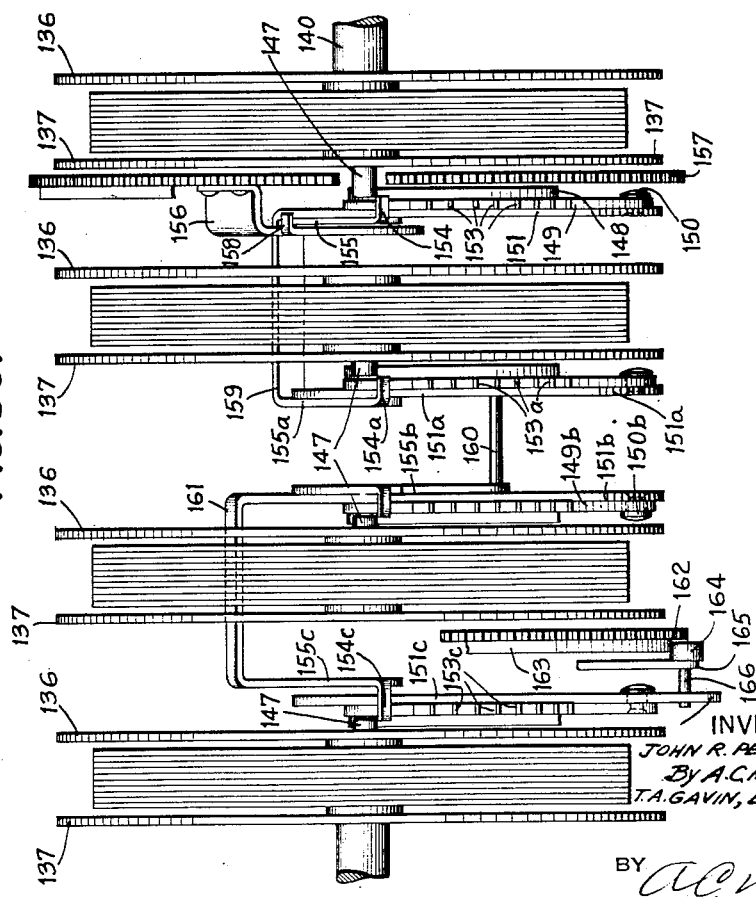
INVENTOR
JOHN R. PEIRCE, Deceased,
By A.C. MABY &
T.A. GAVIN, Executors.
BY A.C. Maby
ATTORNEY Dec. 5, 1939.    J. R. PEIRCE    2,182,001
ACCOUNTING MACHINE
Filed Sept. 21, 1934    30 Sheets-Sheet 21

Inventor
JOHN R. PEIRCE, Deceased
By A.C.MABY & T.A.GAVIN, Executors.
Attorney

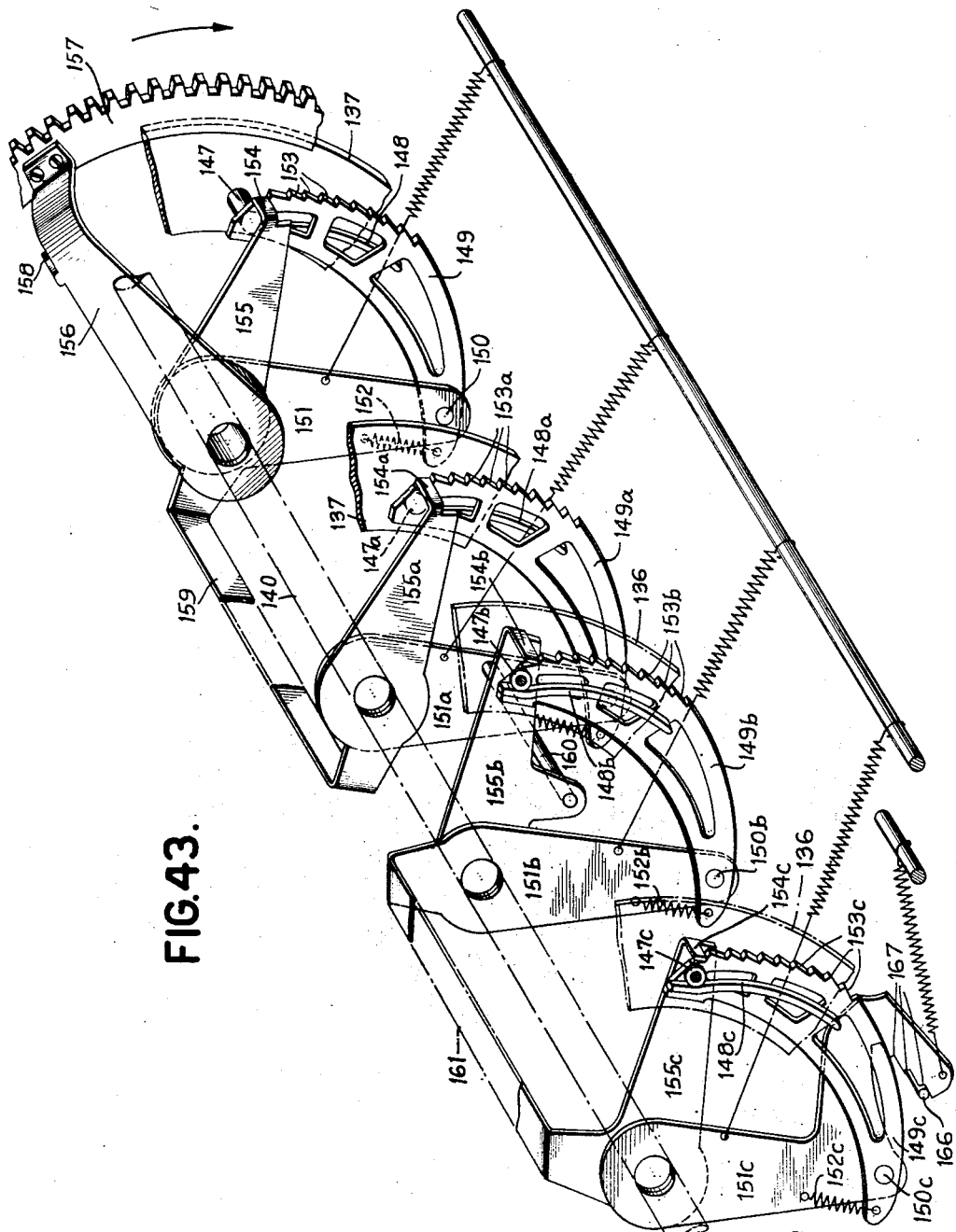

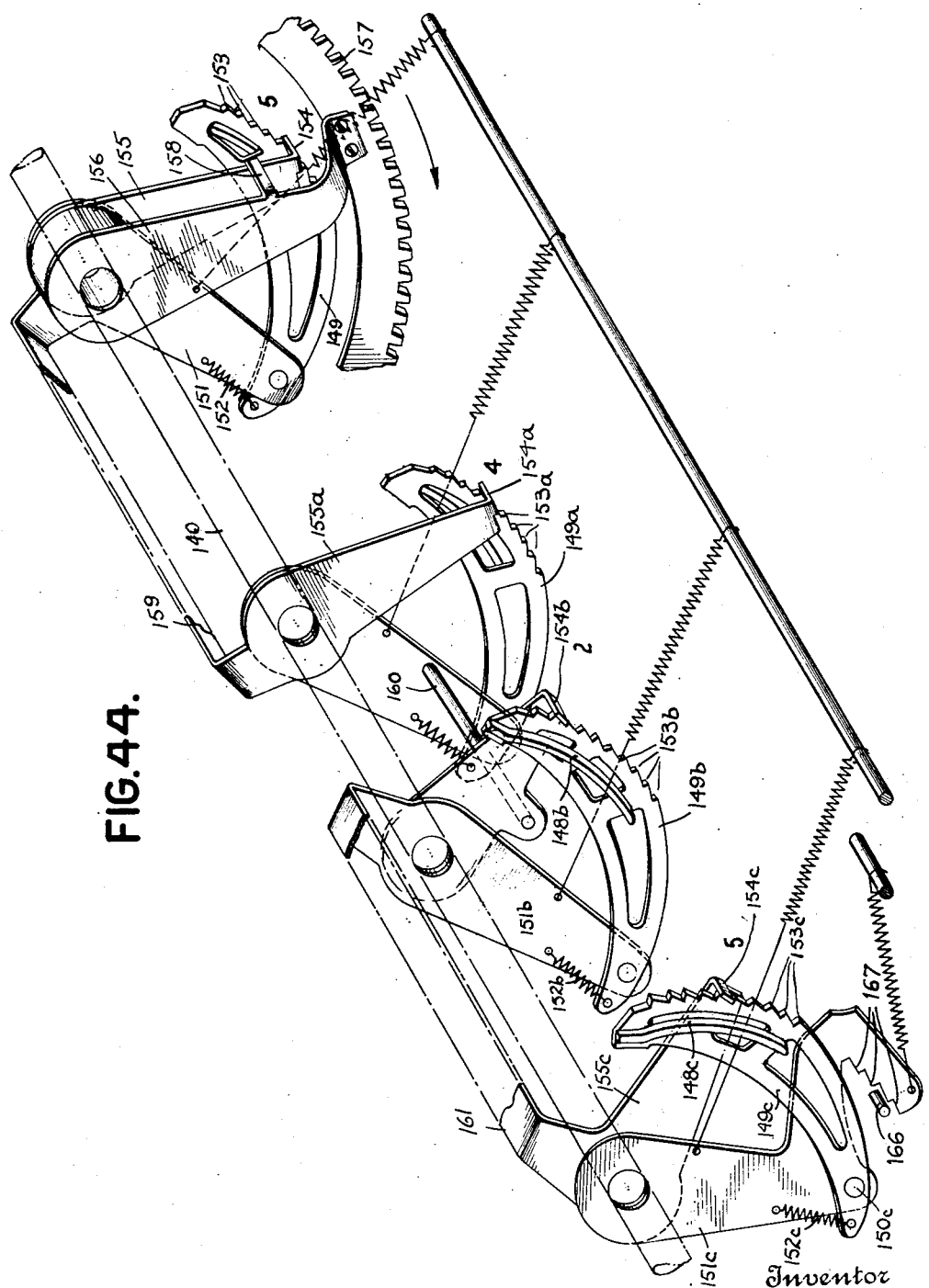

Dec. 5, 1939.   J. R. PEIRCE   2,182,001
ACCOUNTING MACHINE
Filed Sept. 21, 1934   30 Sheets-Sheet 24
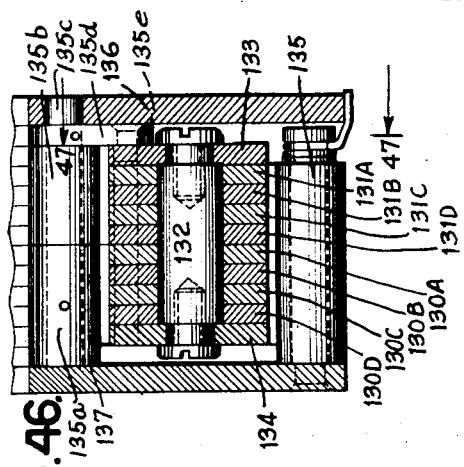
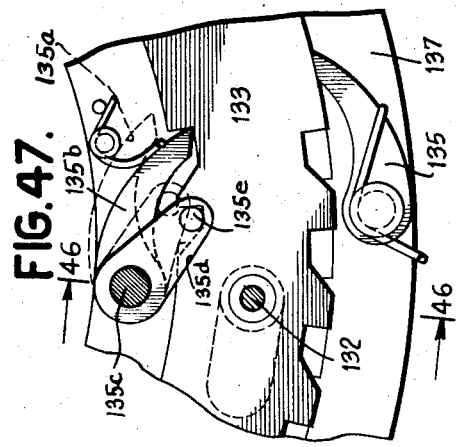
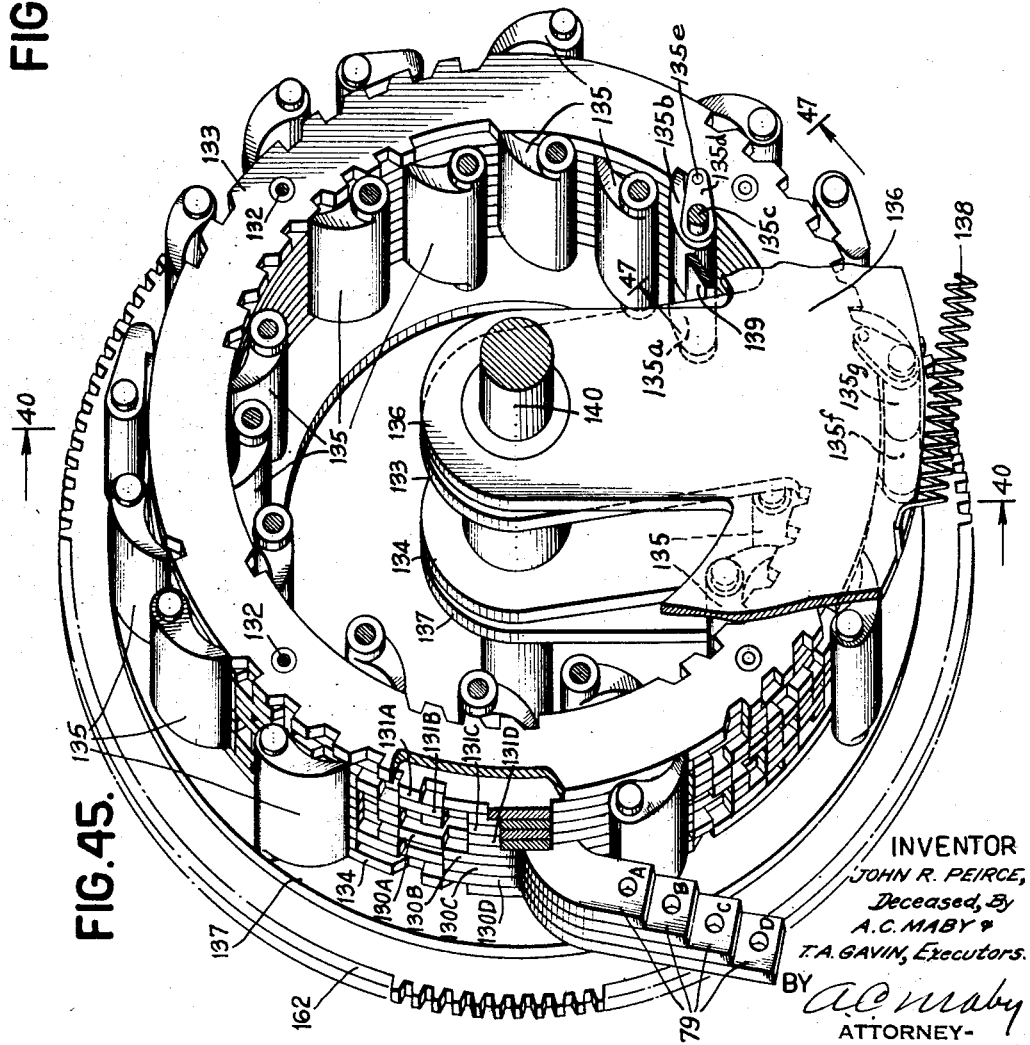
INVENTOR
JOHN R. PEIRCE,
Deceased, By
A.C. MABY &
T.A. GAVIN, Executors.
BY A.C. Maby
ATTORNEY Dec. 5, 1939.    J. R. PEIRCE    2,182,001
ACCOUNTING MACHINE
Filed Sept. 21, 1934    30 Sheets-Sheet 25
FIG.49.
FIG.48.
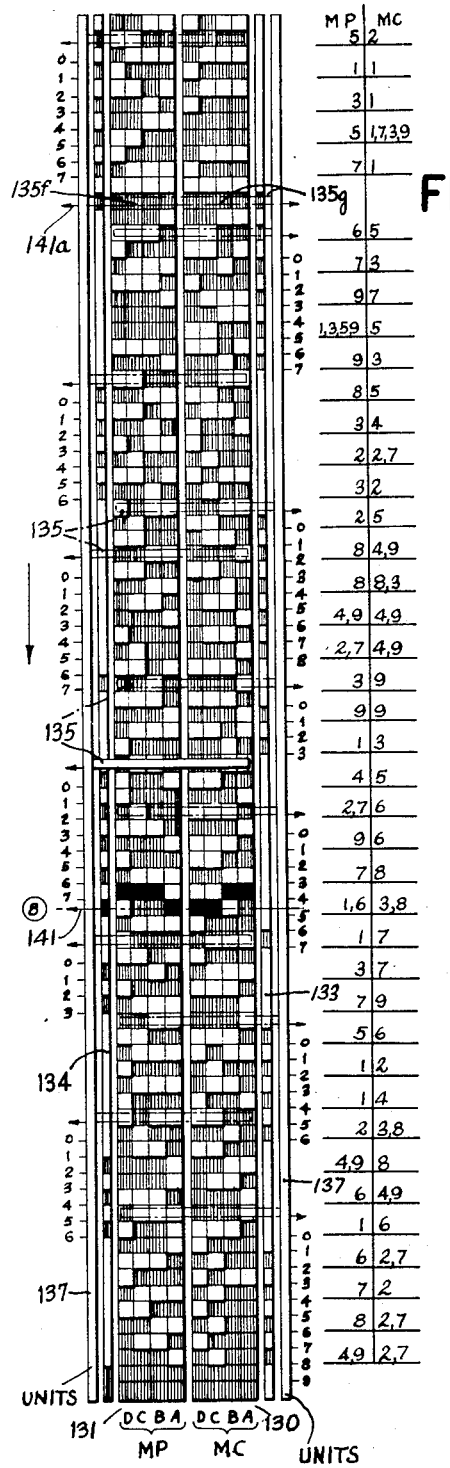
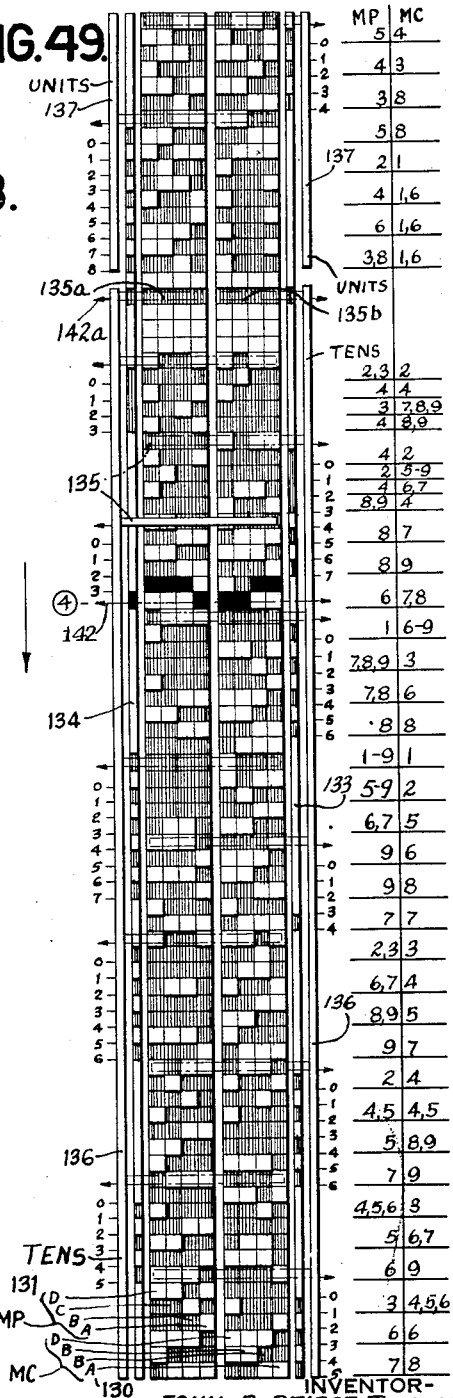
INVENTOR—
JOHN R. PEIRCE, Deceased,
By A.C.MABY & T.A.GAVIN, Executors.
BY
A.C.Maby
ATTORNEY Dec. 5, 1939.   J. R. PEIRCE   2,182,001
ACCOUNTING MACHINE
Filed Sept. 21, 1934   30 Sheets-Sheet 26

Inventor
JOHN R. PEIRCE, Deceased,
By A.C.MABY & T.A.GAVIN, Executors.
Attorney A.C.Maby

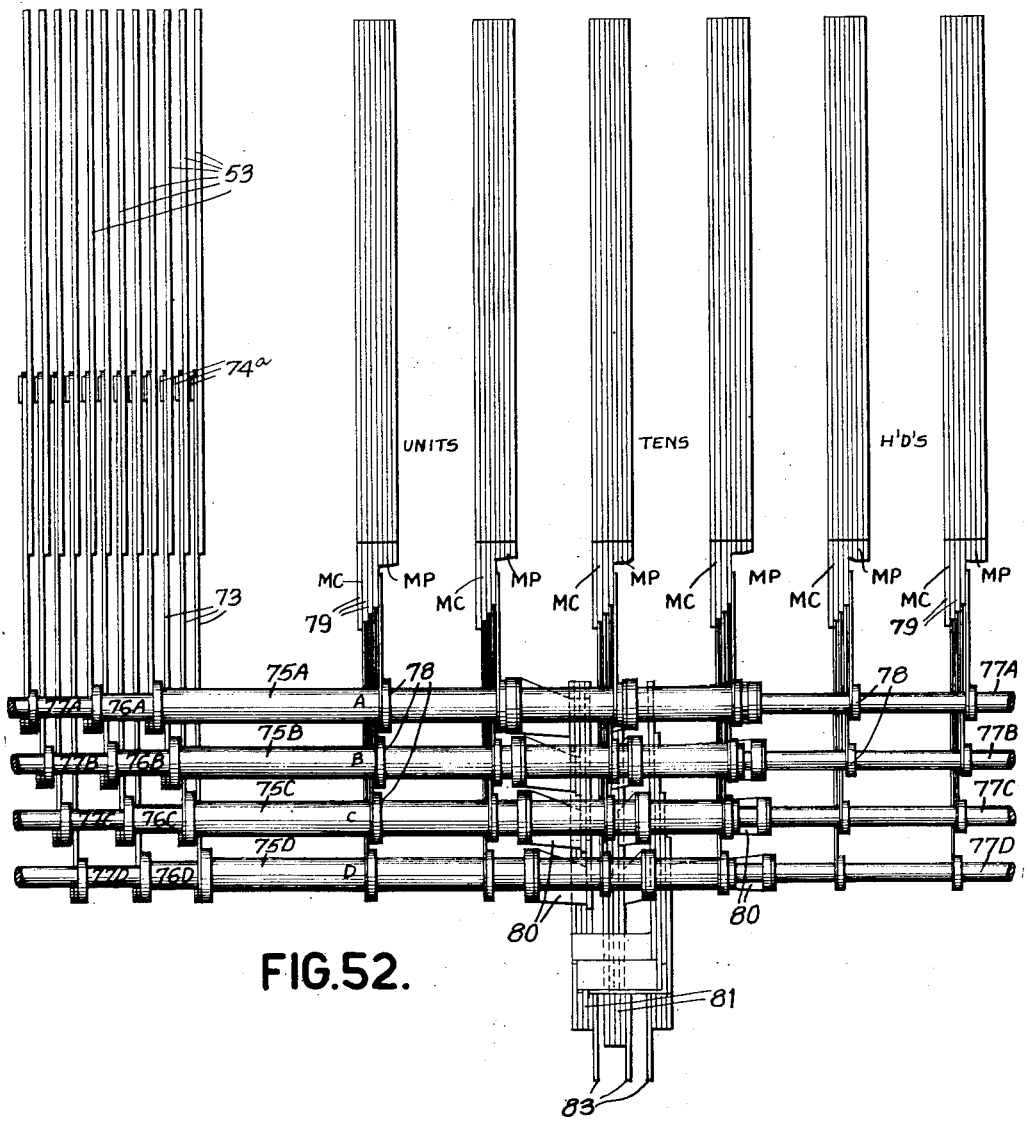

Dec. 5, 1939.　　　　　J. R. PEIRCE　　　　　2,182,001
ACCOUNTING MACHINE
Filed Sept. 21, 1934　　　　30 Sheets-Sheet 28

INVENTOR
JOHN R. PEIRCE, Deceased,
By A.C.MABY & T.A GAVIN, Executors
BY
ATTORNEY

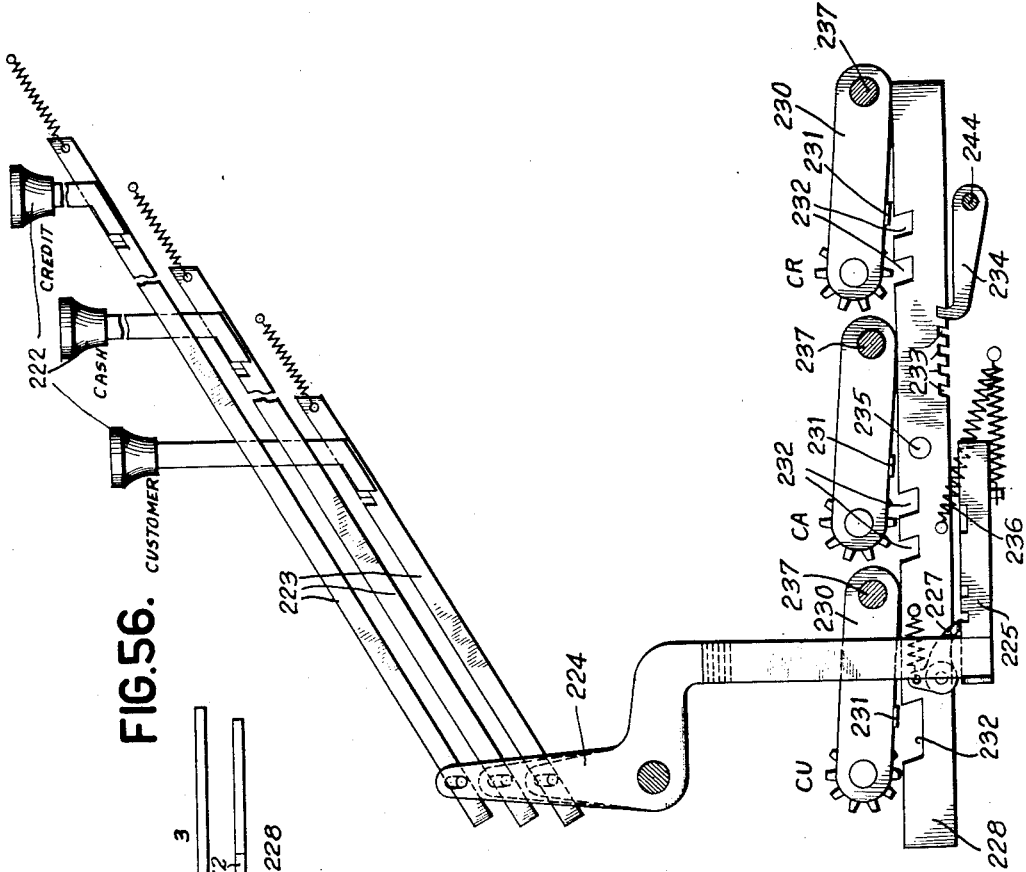
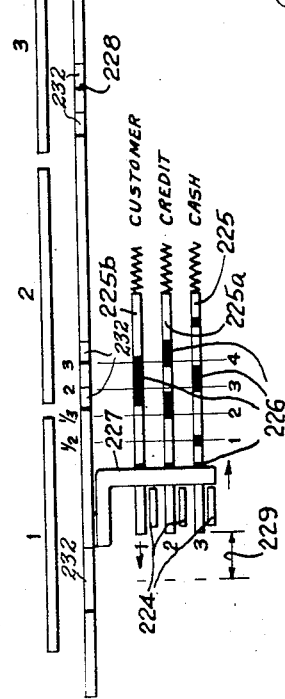

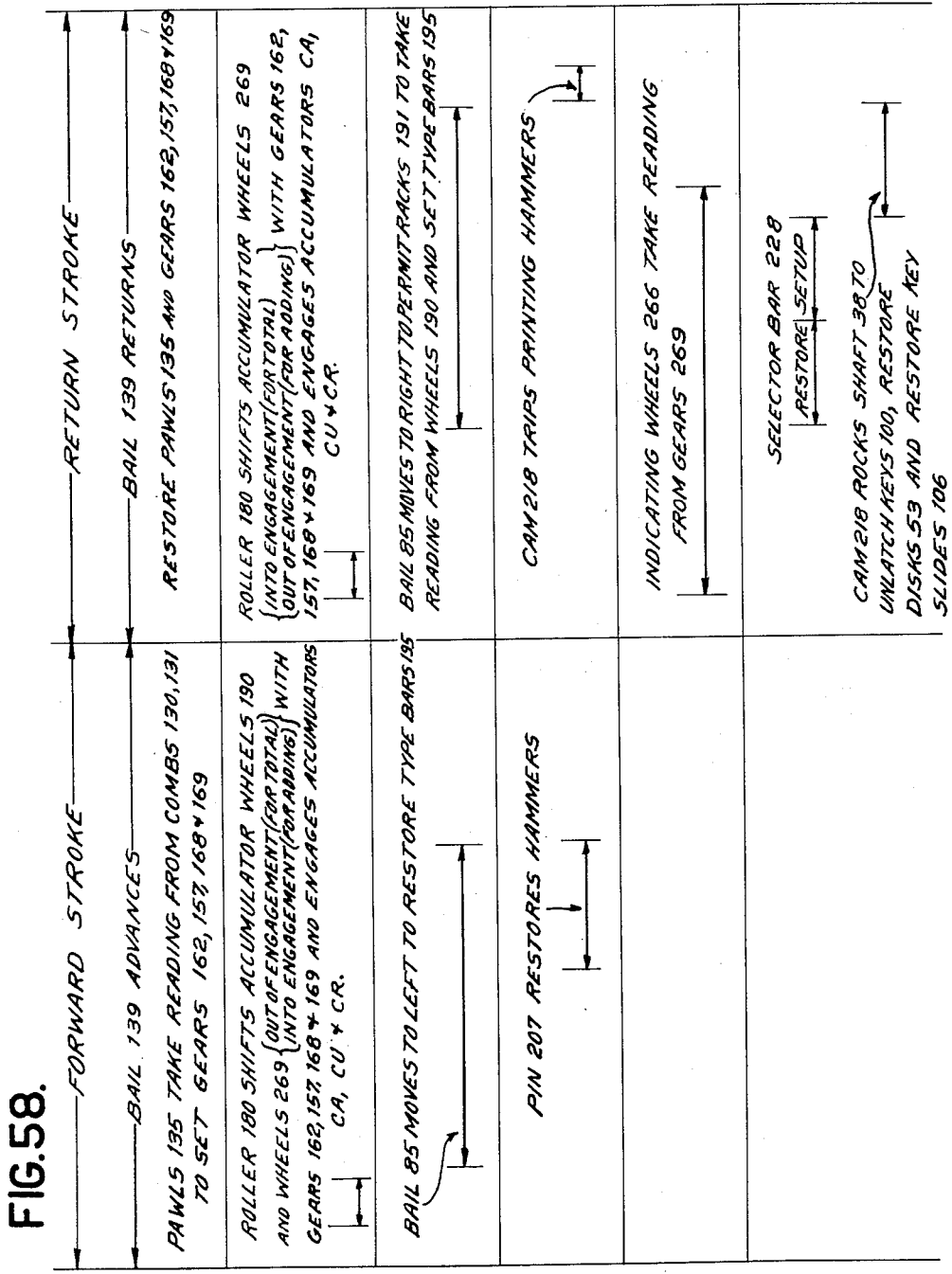

Patented Dec. 5, 1939

2,182,001

UNITED STATES PATENT OFFICE 2,182,001

ACCOUNTING MACHINE

John Royden Peirce, deceased, late of New York, N. Y., by Adelbert C. Maby, Jamaica, and Thomas A. Gavin, Binghamton, N. Y., executors, assignors to International Business Machines Corporation, New York, N. Y., a corporation of New York Application September 21, 1934, Serial No. 744,890

11 Claims. (Cl. 235—60)

This invention relates to accounting machines and more particularly to machines capable of performing the operations of multiplication.

One of the objects of the invention is to provide improved mechanism for multiplying two multi-denominational numbers and recording the product thereof.

A still further object is to provide a machine for multiplying two multi-denominational numbers and obtaining the product therefrom in a single cycle of operation.

Another object is to provide a multiplying machine of improved and simplified construction as hereinafter set forth.

The above objects and others which will be apparent as the nature of the invention is disclosed are accomplished by providing a multiplying machine including elements capable of deriving a partial product from each digit of the multiplier taken in connection with each digit of the multiplicand and concurrently entering all the partial products in suitable entry receiving devices which thereby receive the complete product. In a machine constructed in accordance with this invention the devices for obtaining the partial products each comprises a plurality of circular combs disclosed herein as eight in number having notches irregularly arranged upon the inside and outside edges. As disclosed herein four of the combs are controlled by a digit of the multiplier and the remaining four are controlled by a digit of the multiplicand. When the combs are set up to correspond to two numbers comprising a multiplier and multiplicand the inside and outside notches are sensed by suitable pawl means which are engaged with the aligned notches only and indicate by the position thereof the units and tens digits of the partial product, the units digits being indicated by the pawl cooperating with the inside teeth and the tens digit being indicated by the cam cooperating with the outside teeth or vice versa.

The partial products derived from the above mentioned combs are entered in suitable entry receiving devices.

Denominational order elements are connected to certain combinations of the above mentioned entry receiving devices in such manner that the position of the denominational order elements will be dependent upon the sum of the numbers entered into the various entry receiving devices corresponding to a given column of the partial products. The denominational order elements are provided with suitable carrying means and the total indication set up thereon will correspond to the sum of the various partial products and consequently the desired total products. Various keyboards are arranged to be operated in accordance with numbers representing the multiplier and multiplicand, respectively, which are connected to the circular combs by mechanism capable of selecting and moving certain of the combs to set up the desired combination. An additional set of combs is operated by each set of keys and controls printing mechanism to print upon a record sheet the set up multiplier and multiplicand. The printing elements also cooperate with the denominational order elements to print the product of the above two numbers upon the record sheet.

Various other objects and advantages of the invention will be obvious from the following particular description of one form of mechanism embodying the invention or from an inspection of the accompanying drawings. The invention also constitutes certain new and novel features of construction and combination of parts hereinafter set forth and claimed.

In the drawings:

Fig. 4 is a section along line 4—4 of Fig. 3 showing further details of the scale reading devices.

Fig. 5 is a partial plan view of Fig. 4.

Fig. 6 is a specimen of a record prepared by the machine.

Fig. 7 is an end view taken on line 7—7 of Fig. 1 showing the operating mechanism of the machine.

Fig. 8 is a central section of the machine taken on line 8—8 of Fig. 1.

Fig. 9 is a detail of the printing hammer mechanism.

Fig. 10 is a detail of a product receiving gear.

Fig. 11 is a section taken on line 11—11 of Fig. 1.

Fig. 12 is a detail of the scale reading take-off mechanism.

Fig. 13 is a detail section taken on line 13—13 of Fig. 12.

Fig. 14 is a detail of the multiplier key setup devices.

Figs. 15, 16, 17, and 18 are details of the combs for controlling the setting of the multiplier printing type bars.

Fig. 19 is a further detail of the scale reading take-off mechanism showing its relationship to the multiplicand keys.

Figure 20:
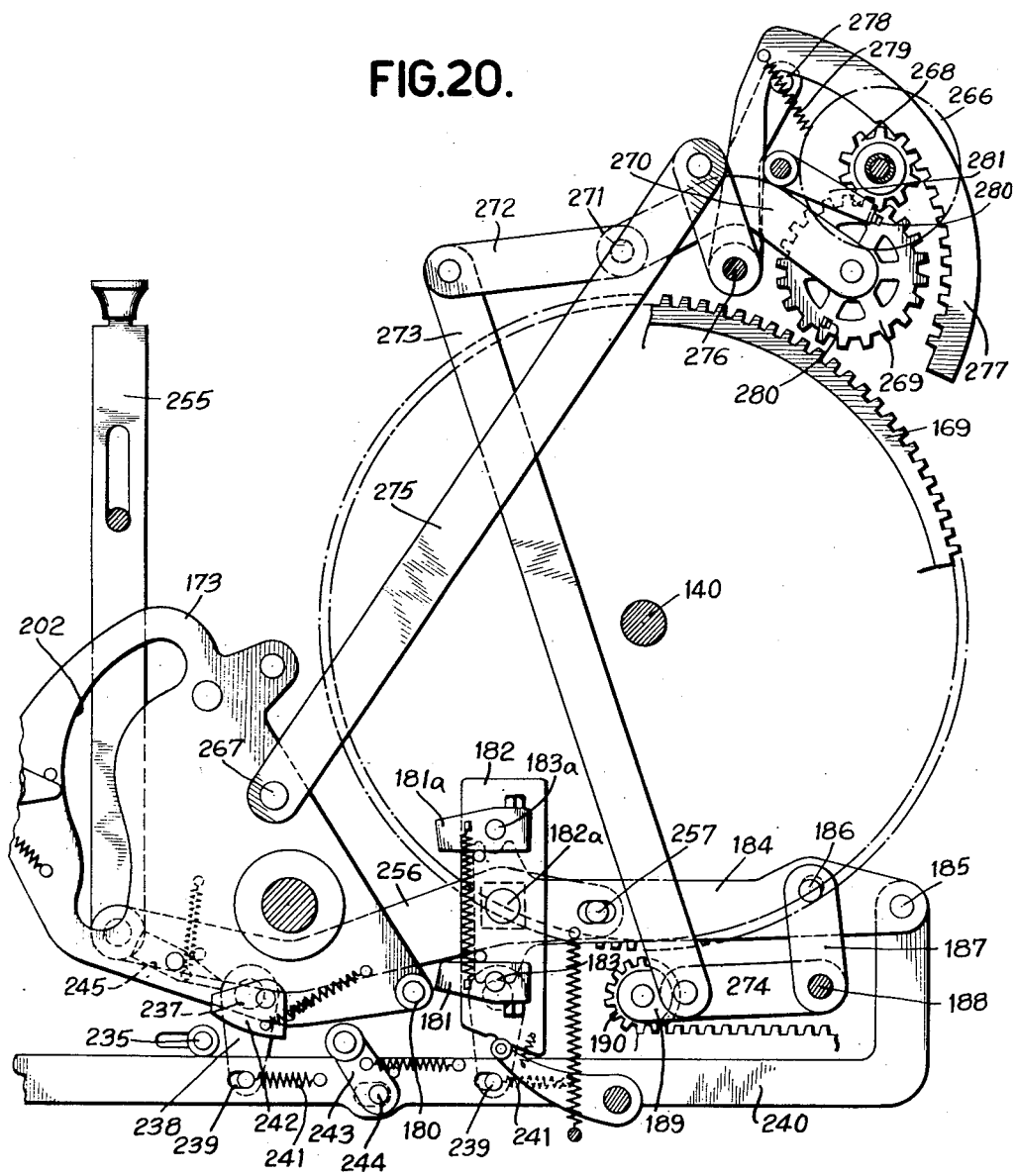

Fig. 20 is an enlarged detail of the product receiving mechanism and the controls for the same.

Fig. 21 is a detail of the scale reading take-off mechanism.

Fig. 22 is a plan view of Fig. 21.

Figs. 23 and 24 are details in isometric of parts shown in Fig. 21.

Figure 25:
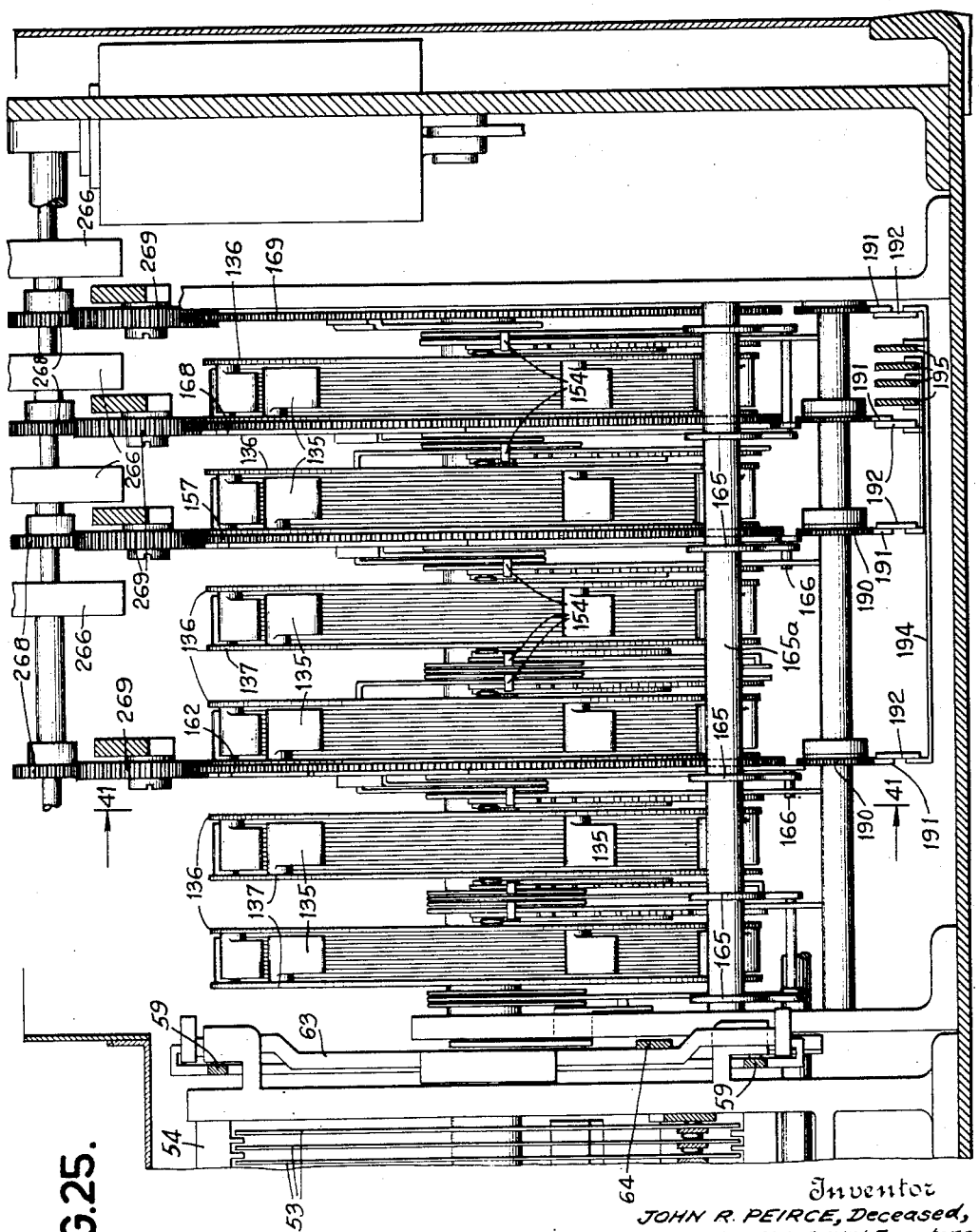

Fig. 25 is a view looking from the front of the machine of the multiplying mechanism.

Figure 26:
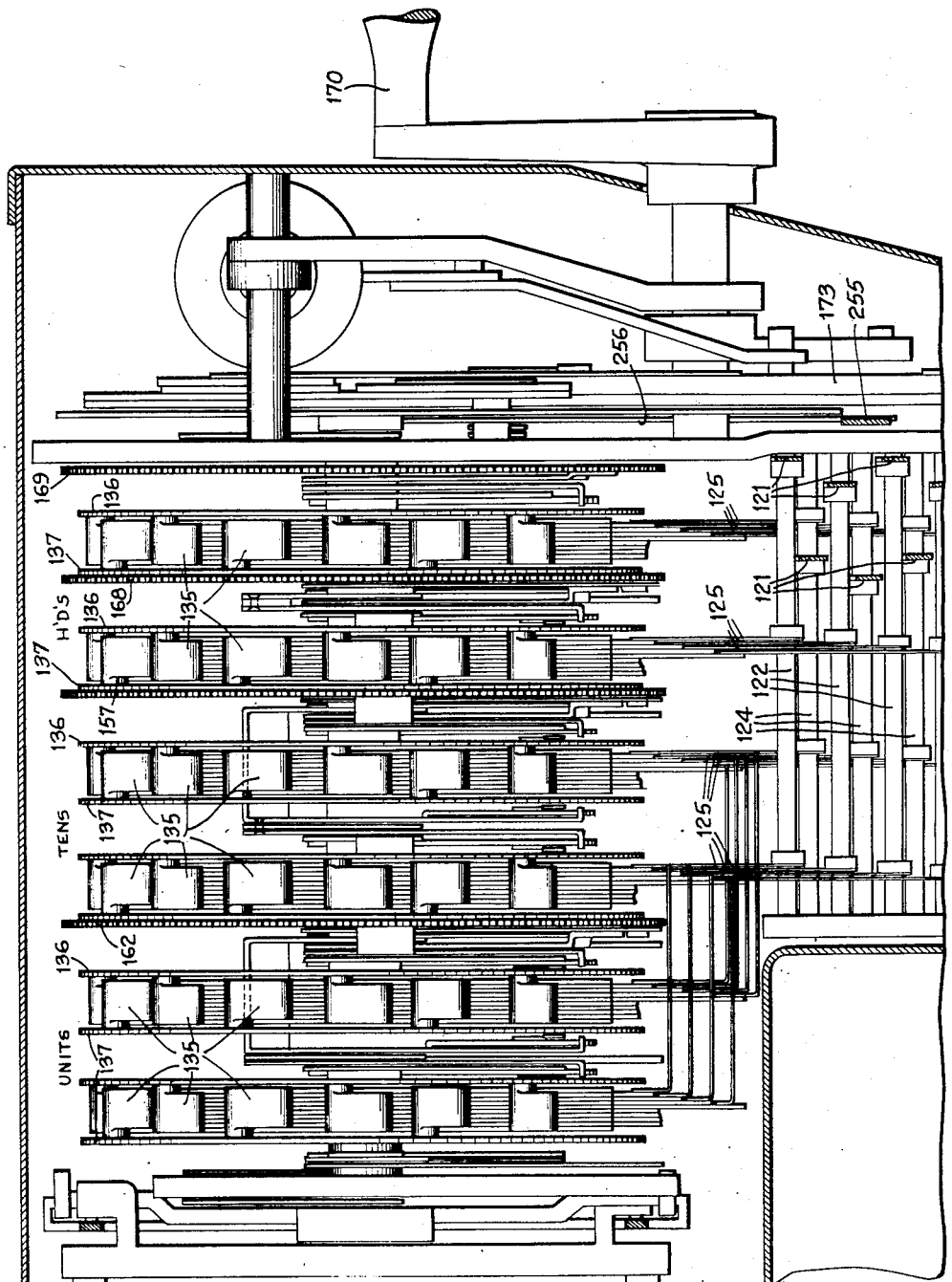

Fig. 26 is a similar view in plan.

Figure 27:
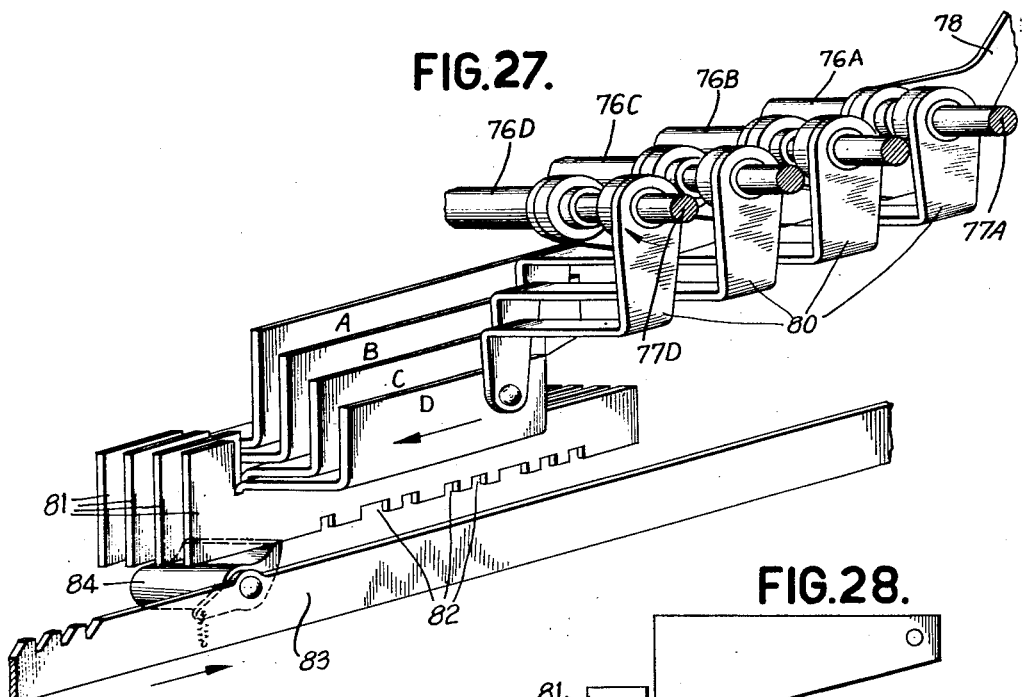

Fig. 27 is a detail isometric view showing the comb arrangement for controlling the printing type bar for printing the multiplicand.

Figure 28:
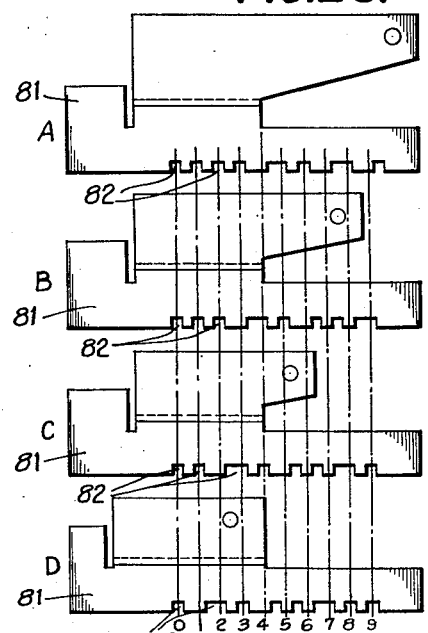

Fig. 28 is a view showing the combs of Fig. 27 in separate detail.

Figure 29:
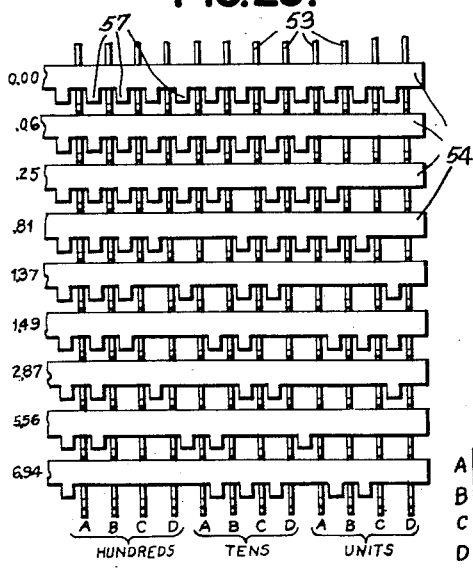

Fig. 29 is a diagram showing the arrangement of cuts in representative scale set combs.

Figure 30:
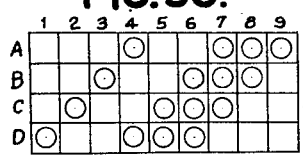

Fig. 30 is a diagram of the combinational code arrangement in accordance with which the multiplying devices are adjusted to receive factors.

Fig. 31 is a detail of the key mechanism.

Fig. 32 is a detail section on line 32—32 of Fig. 31.

Fig. 33 is a detail section on line 33—33 of Fig. 31.

Fig. 34 is a plan detail of the accumulators and operating connections therefor.

Fig. 35 is a view looking from the front of the machine of the keyboard and connections thereto.

Fig. 36 is a detail of the product indicating wheels.

Figs. 37 and 38 are details of the key controlled combination bars and the arrangement of the stops thereon.

Fig. 39 is a detail of a plurality of sets of multiplying units and the carrying connections therebetween.

Fig. 40 is a central section of a multiplying unit.

Figure 41:
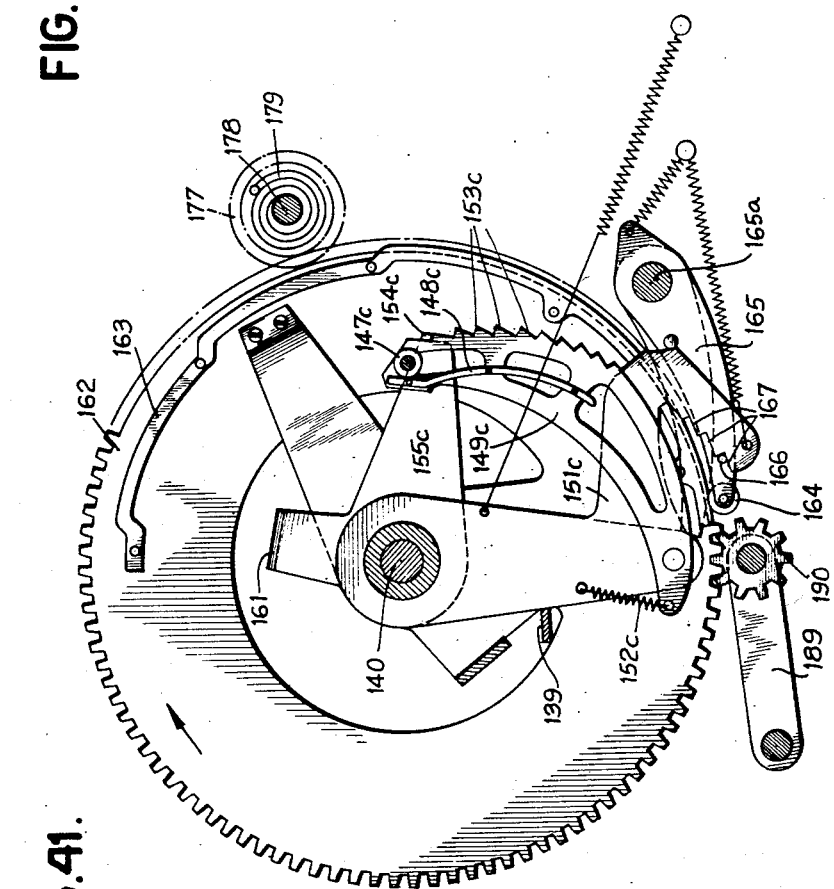

Fig. 41 is a detail of the carry mechanism associated with the multiplying units. The section is taken substantially on line 41—41 of Fig. 25.

Figure 42:
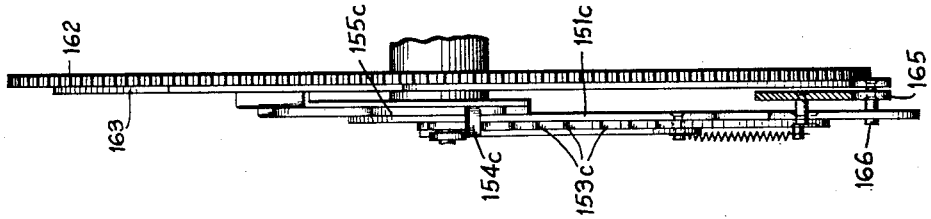

Fig. 42 is an end view of Fig. 41.

Fig. 43 is an isometric view showing the carry mechanism of the multiplying units in expanded form and in normal position.

Fig. 44 is a similar view to Fig. 43 with the parts in moved position.

Fig. 45 is an isometric view of a complete multiplying unit.

Fig. 46 is a detail section on line 46—46 of Fig. 47.

Fig. 47 is a detail of one of the multiplying unit pawls.

Fig. 48 is a development and accompanying table of the outer periphery of one set of multiplying combs.

Fig. 49 is a similar view of the inner surfaces of the multiplying combs.

Figure 50:
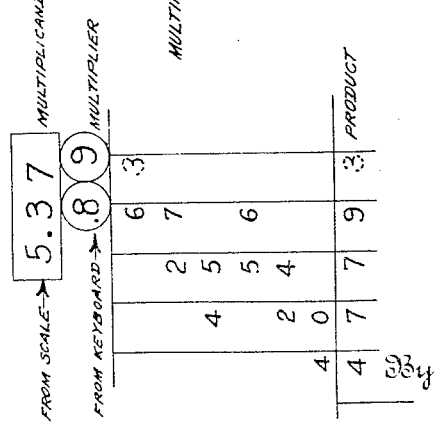

Fig. 50 is a representation of a problem.

Figure 51:
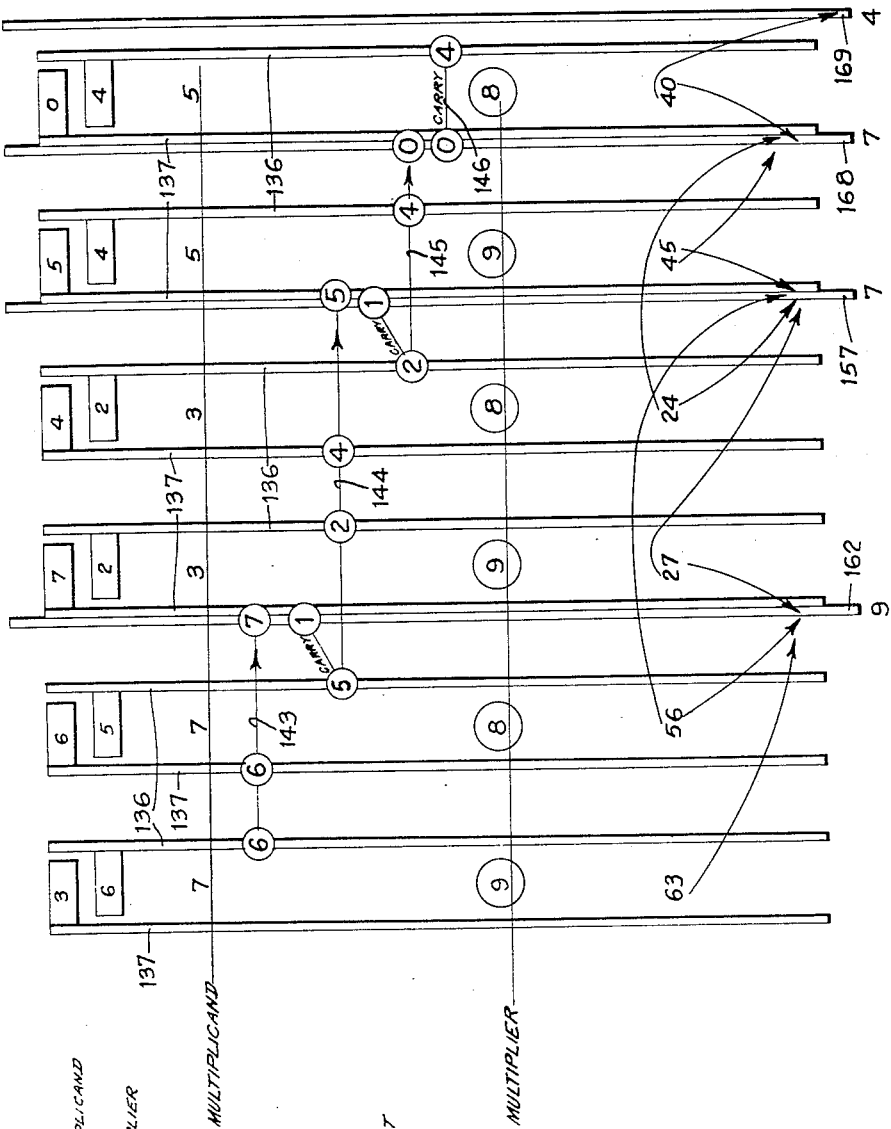

Fig. 51 is a diagram showing the theory of operation of the multiplying units.

Fig. 52 is a plan detail of the cross-over connections between the scale read-out disks and the multiplying units.

Figure 53:
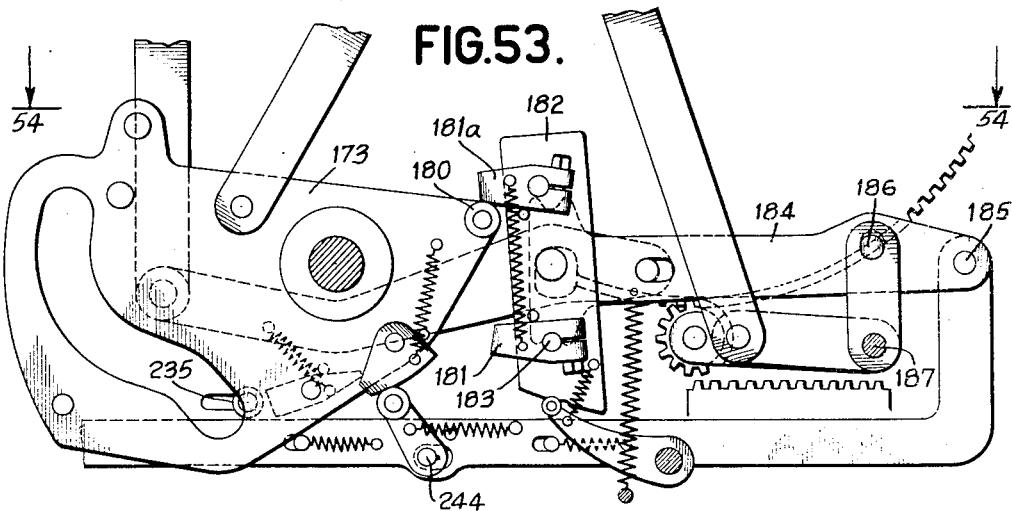

Fig. 53 is a detail of parts shown in Fig. 20 in moved position.

Figure 54:
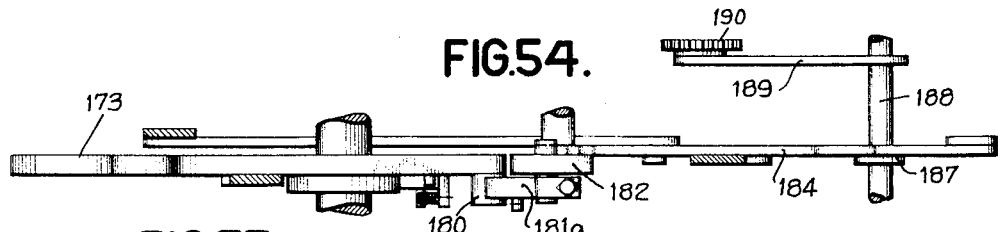

Fig. 54 is a detail taken on line 54—54 of Fig. 53.

Figure 55:
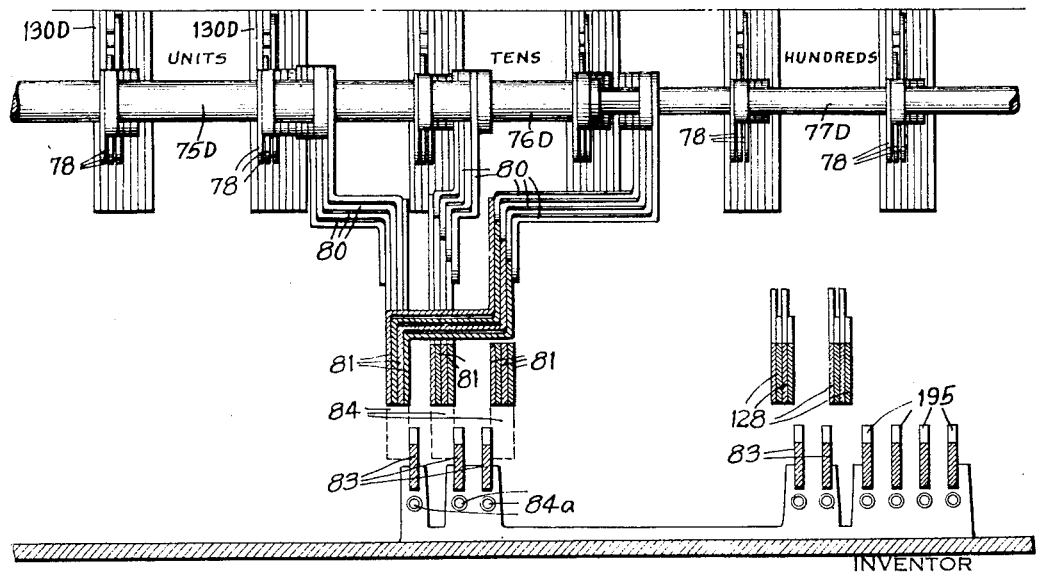

Fig. 55 is a detail showing the connections between the multiplicand type bar and the cross-over connections to the multiplying units.

Fig. 56 is a detail of the accumulator selecting mechanism.

Fig. 57 is a diagram showing the arrangement of the notches in the accumulator selecting combs.

Fig. 58 is a diagram illustrating schematically the sequence of operations.

Weighing mechanism

Figure 1:
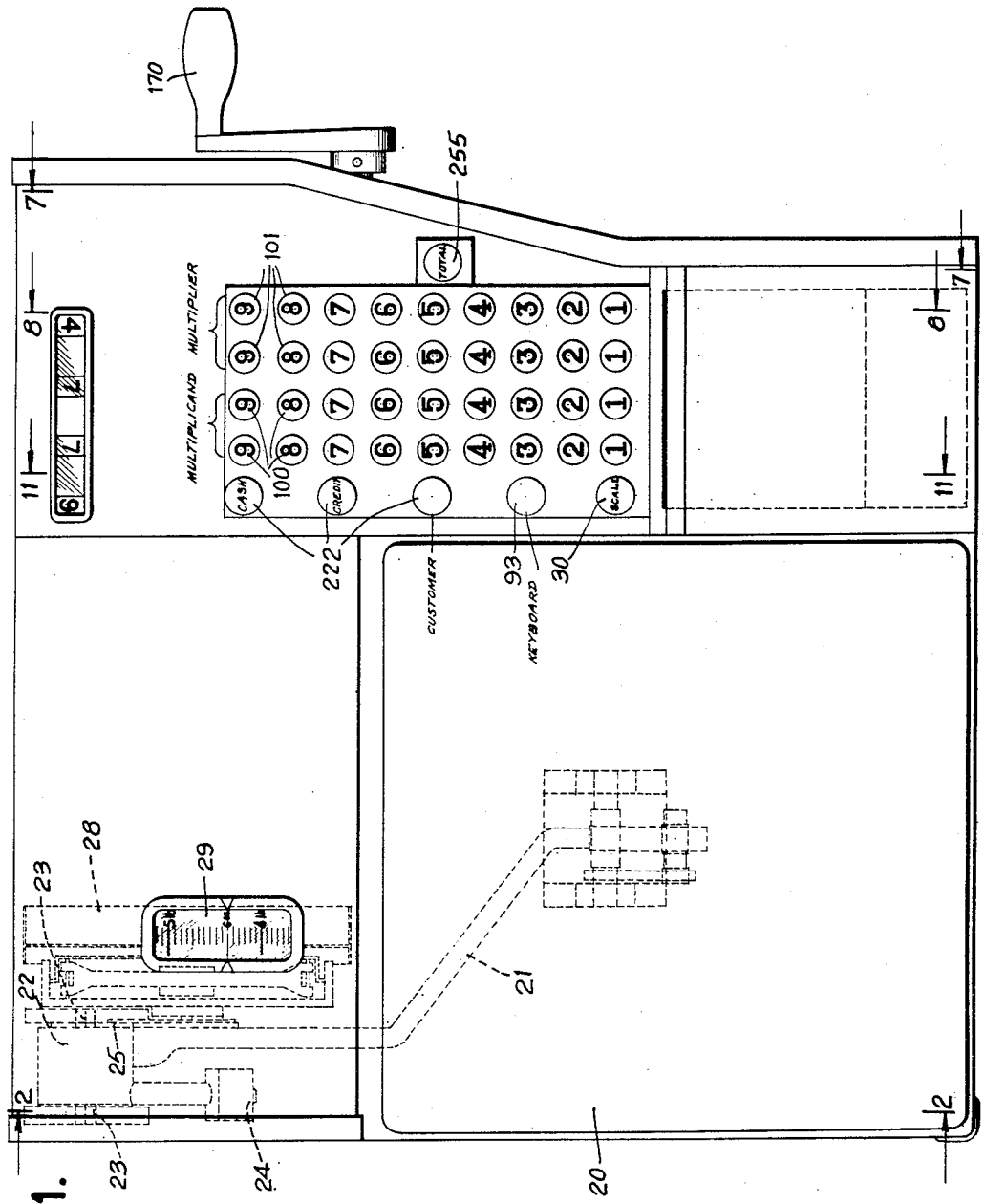
Fig. 1 is a plan view of the complete machine embodying the invention.
Figure 2:
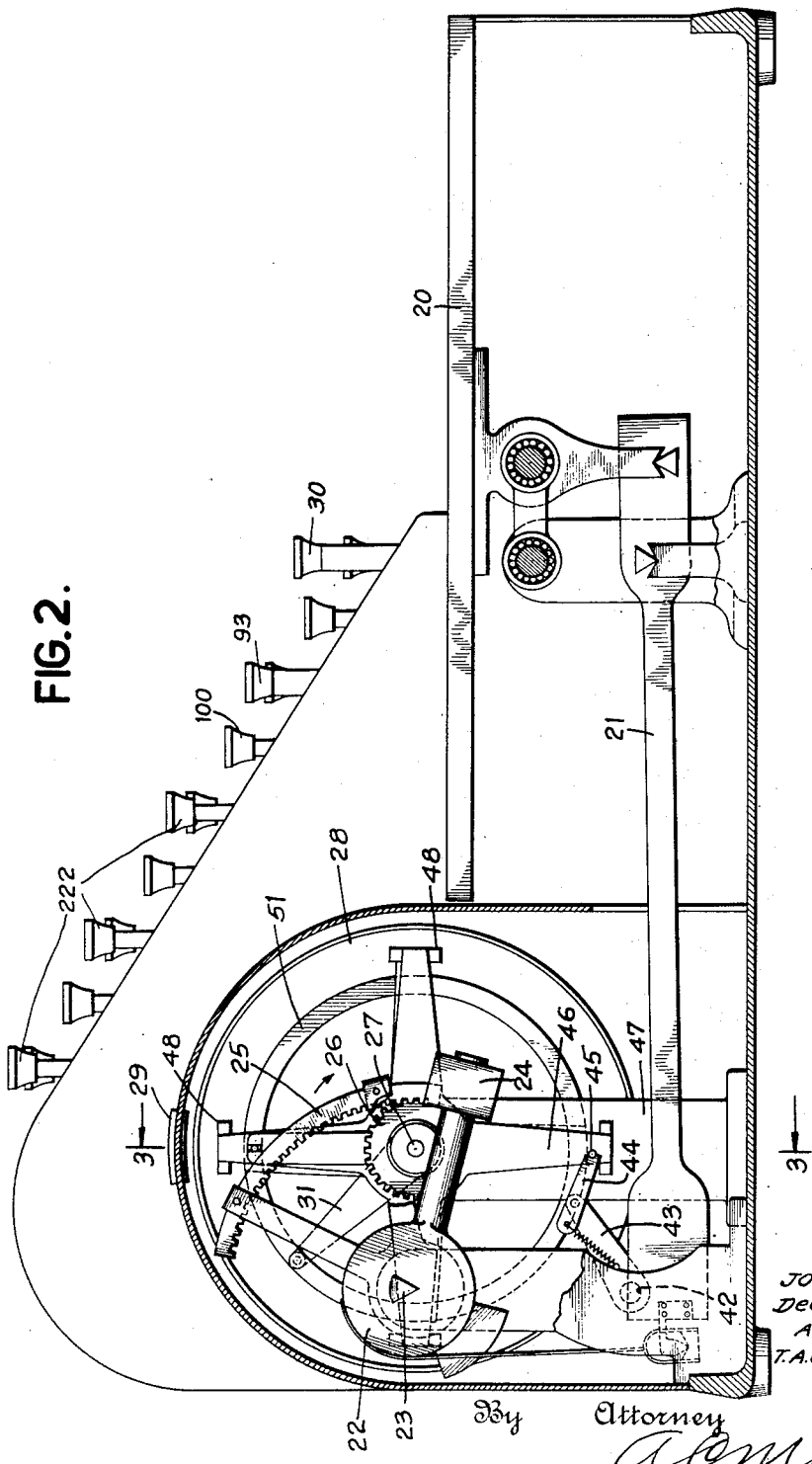
Fig. 2 is an end view taken on line 2—2 of Fig. 1 showing the weighing mechanism from which one of the factors of a multiplication may be obtained.
Figure 3:
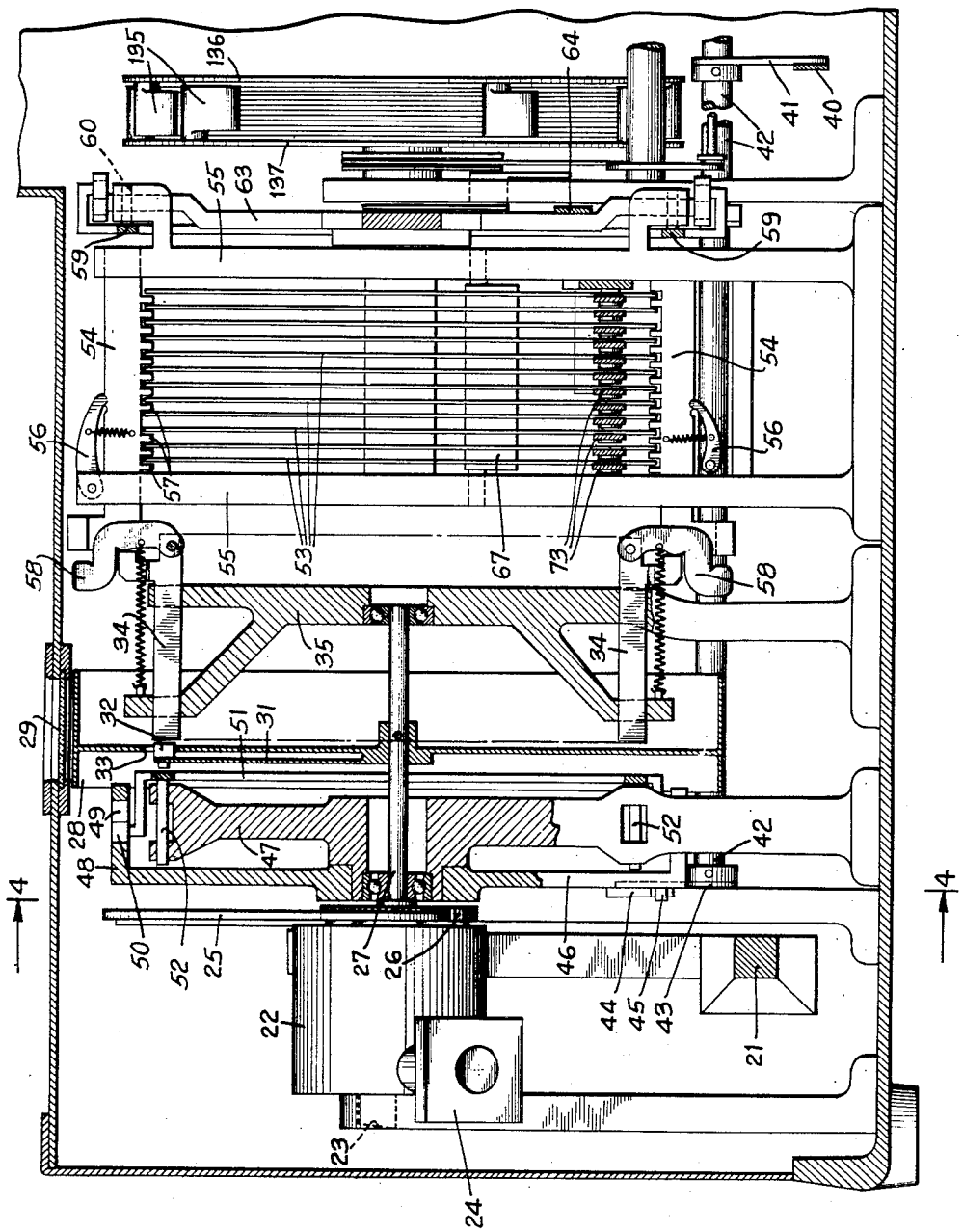
Fig. 3 is a section taken on line 3—3 of Fig. 2 showing the mechanism whereby the scale reading may be transferred to the multiplying mechanism.

Referring to Figs. 1 and 2, the scale platform 20 is suitably mounted for cooperation with base lever 21, which through the usual nose iron, stirrup, and tape cooperates with the usual eccentric hub 22, which is pivoted at 23 (see also Fig. 3). Integral with the eccentric hub 22, is a descending pendulum 24 and a rack sector 25. The sector 25 cooperates with a gear 26 secured upon a shaft 27, which is suitably mounted in ball bearings and to which is also secured a cylindrical chart 28. A weight applied to the platform 20 will, through the linkage just traced, effect clockwise rotation of the chart 28, as viewed in Fig. 2. Suitable graduations of the chart will move in transit past an indicator located in a suitable opening or window 29, so that the weight of the article or package placed upon the platform may be indicated.

Scale setting read-out mechanism

After an article has been placed on the scale platform, and the chart has come to rest at the indication corresponding to the weight of the article, the depression of the "scale" key 30 (Fig. 1) will cause the taking of a reading from the chart through the mechanism which will now be described.

Referring to Figs. 3 and 4, the chart 28 has, integral therewith, a resilient arm 31, whose free end carries a pin 32, which extends through an opening 33 in the central wall of the chart. Arranged concentrically about shaft 27 are a number of sliders 34. These sliders are mounted for horizontal movement in a fixed frame 35, and their lateral or circumferential spacing may be in accordance with the closeness of the reading desired. In the present instance their spacing is in increments of approximately six one-hundredths of a pound. It will thus be apparent that while the chart indicates visually in pounds and ounces, the reading to be taken therefrom will be in accordance with a decimal notation, which is a more convenient notation for the purpose of performing multiplication.

Thus  1 ounce  will be converted to .06
Thus  2 ounces will be converted to .13
Thus  3 ounces will be converted to .19
Thus  4 ounces will be converted to .25
Thus  5 ounces will be converted to .31
Thus  6 ounces will be converted to .37
Thus  7 ounces will be converted to .44
Thus  8 ounces will be converted to .50
Thus  9 ounces will be converted to .56
Thus 10 ounces will be converted to .62
Thus 11 ounces will be converted to .69
Thus 12 ounces will be converted to .75
Thus 13 ounces will be converted to .81
Thus 14 ounces will be converted to .87
Thus 15 ounces will be converted to .94

After the chart 28 and its pin 32 have been positioned, the later is pressed toward the right, as viewed in Fig. 3, into engagement with the slider 34 with which it is in alignment at such time. This action is effected in the following manner: Referring to Fig. 12, the "scale" key 30 carries a pin 36 which extends into a slot in a member 37 loosely mounted on a rod 38. An arm 39 on member 37 has connection with a link 40, which in turn, through an arm 41, rocks a shaft 42 in a clockwise direction as viewed in Fig. 12. The shaft 42 has secured thereto (see Figs. 3 and 4) an arm 43 which carries a spring-pressed finger 44 at its free end. Finger 44 is adapted to engage a pin 45 carried in one arm of a four-armed member 46, which is mounted for oscillation on frame member 47. Each arm of member 46 carries a lateral extension 48, in which is an oblique slot 49 (Fig. 5). Within each slot is a roller 50 which is carried by the ring 51. Rocking of shaft 42 in a clockwise direction, will cause finger 44 to move pin 45 toward the right, as viewed in Fig. 4, thus moving the member 46 slightly in a counterclockwise direction. Since the ring 51 is restrained against rotation, as will be presently explained, the rocking of member 46 will cause the cam slots 49 in the free ends of the several arms to cooperate with the rollers 50, and cause the latter to move in an axial direction, or as viewed in Fig. 3, toward the right. The ring 51 has several pins 52 integral therewith, the latter being slidably mounted in the frame 47, thus serving to support the ring, and guide its axial movement. In Fig. 21 is shown the moved position of the several parts which have just been described. The ring 51 has been moved toward the right into engagement with the pin 32, forcing the latter against the slider 34 with which it is in alignment.

Scale-reading translating mechanism

In order to reduce the number of parts necessary to perform the multiplying operation, the scale reading is translated into a code reading. This code reading being based on the Peirce combinational hole system as diagrammatically represented in Fig. 30. In Fig. 3 are shown 12 disks 53 of which the right hand four are allocated to the units order, the central four to the tens order and the four on the left to the hundreds order. The twelve disks are entirely similar in their configuration and each has a series of notches on its circumference as shown in Fig. 19. Cooperating with the disks 53 are a plurality of sliders 54 of which there is one for each slider 34. The manner of connection between slider 34 and its corresponding slider 54 is such, that when the former is moved toward the right as viewed in Fig. 3 under control of the pin 32 it will cause corresponding movement of its associated slider 54. The sliders 54 are mounted for reciprocation in frame members 55 and are adapted to be held in either of two positions by a spring-pressed detenting member 56 cooperating with suitable notches in the upper edges of sliders 54. The lower edge of each slider 54 is provided with a plurality of depending projections or tabs 57, normally positioned out of alignment with the disk 53. The projections 57 are arranged on the sliders 54 in accordance with the combination code in Fig. 30. The manner of their cooperation with the disks 53 may best be understood in connection with a specific example. Referring to Fig. 29, a number of representative sliders 54 are here shown in diagrammatic form and shown in cooperation with the disks 53, which have been arranged in three groups labeled Units, Tens, Hundreds. Each group is further sub-divided into positions A, B, C, and D.

The uppermost slider 54, which is associated with the zero position of the scale has projections 57 in all positions, so that if the scale reading is zero, depression of the "scale" key 30 will move the uppermost slider 54 toward the right, causing each of the disks 53 to be intercepted by a projection on slider 54, thus holding all of the disks against rotation. The second slider associated with the quantity .06 has projection 57 in all positions except the B, C, D positions in the units order. This is in accordance with the code in Fig. 30 where the numeral 6 is represented by circles in the B, C, and D positions, so that with the scale positioned at six one-hundredths of a pound, the second slider 54 will be moved toward the right and all disks 53 will be blocked against movement except the units order disks B, C, and D. The movement of these three selected disks will effect the setting up of a multiplicand of six in the multiplying mechanism in the manner to be explained. The third slider 54 is notched in accordance with the weight of twenty-five one-hundredths of a pound. It will be noted that projections 57 are provided in all positions, except the C position in the tens order and the C and D positions in the units orders. Reference to Fig. 30 will show that this is in accordance with the value of "two" and "five" in such table. In this manner each of the sliders 54 will control the operation of the disks 53 to release those disks which represent the weight value of the slider in accordance with the coding of Fig. 30.

Referring to Figs. 3, 21 and 22 it will be noted that connection between sliders 34 and 54 is through an intermediate member 58, which member is pivotally mounted upon the slider 34 next adjacent to the slider which is to actuate the member 58.

Thus, as shown in Fig. 24, the central slider 34 has been moved towards the right by pin 32, and the upward extension of such slider 34 has engaged member 58 carried by the slider on the left, causing the free end of member 58 to engage the slider 54 in alignment with the central slider 34. The final position of the parts being as shown in Fig. 21, where the movement of slider 34 has been multiplied through member 58 to effect a somewhat greater movement of the corresponding slider 54. Referring to Fig. 22, it will be noted that the pin 32 is greater in diameter than the distance between adjacent sliders 34 so that it is possible that for a given scale setting the pin 32 may cooperate with more than one slider 34 and move both toward the right. By virtue of the manner of connection between the sliders 34 and 54, only one of the sliders 34 will cause an effective movement of its cooperating slider 54. This action is illustrated in Fig. 23 where the two central sliders 34 are shown as having been simultaneously advanced by the pin 32, but only the nearest member 58 has been actuated sufficiently to move its related slider 54. It will be observed in Fig. 23 that the central member 58 has its pivot point advanced along with its actuating slider 34. Thus the relative positions of the two advanced sliders 34 and the member 58 lying between them is not changed and such member is simply advanced to take up the working clearance, but not far enough to operate a slide 54.

The sliders 54 are restored to their normal position after the completion of the various operations of the machine under control of mechanism similar to that employed in taking the reading from the scale chart. A ring 59 is provided (see Figs. 3 and 21) mounted for movement in an axial direction by means of pins 60 slidably mounted in one of the frames 55. The ring 59 supports several rollers 61 which are disposed within cam slots 62 in a four-armed member 63 which is mounted for oscillation as seen in Fig. 19. One arm of the member 63 is connected to a link 64 whose other end is connected to an arm 65 secured to shaft 38.

As will be explained in detail later, the shaft 38 is rocked slightly clockwise during the operation of the machine and causes oscillation of members 63 to move the ring 59 against the sliders 54 in the familiar manner. It will be apparent, of course, from the nature of the construction that it is only necessary to so restore the sliders 54, the cooperating sliders 34 having been restored by their associated springs as shown.

Scale multiplicand set-up

The next step in the operation of the machine, is to transfer the coded scale reading to the actual multiplying mechanism. This is accomplished as follows: In Figs. 12 and 13 a restoring bar 66 is provided which cooperates with the twelve disks 53 to restore them in a clockwise direction at the end of a multiplying operation, at which time a latching bail 67 is adapted to cooperate with notches 68 in the several disks to hold them in restored position, while the bail 66 returns toward the right, leaving the disks in their restored position. Secured to shaft 42 is an arm 69 which has connected thereto a link 70 whose upper end is pivoted to an arm 71, which in turn is connected at the pivot point of bail 67. The time of operation of this mechanism is such that as shaft 42 is rocked under control of the "scale" key 30 to set up the several sliders 34 and 54, bail 67 will be rocked in a clockwise direction subsequent to the setting of the sliders, due to the lost motion connection through the slot in link 70, thus permitting the disks 53 to rock in a counterclockwise direction under the influence of their springs 72 to take position under control of the selected slider 54. Each disk 53 has a link 73 connected thereto at 74a (see also Fig. 52). The other extremity of each link is connected to an arm 74 carried by one of a group of sleeves 75A—75D, 76A—76D or to one of shafts 77A—77D (see also Fig. 52).

As seen in Fig. 52, the four disks 53 associated with the "units" order are connected to the links 73 and arms 74 to four sleeves 75 suffixed A, B, C and D, the four disks 53 associated with the "tens" order are similarly connected to sleeves 76, A, B, C and D telescoped within the sleeves 75 and the four disks 53 associated with the hundreds order are connected to rods 77 which in turn are located within the sleeves 76. In Fig. 52 are shown six multiplying units, each comprising eight individual multiplying combs, the four on the left being designated "multiplicand combs" and the four on the right designated "multiplier combs". Through connections presently to be described, the sleeves 75 control the setting of the multiplicand combs of the two multiplying units farthest toward the left. The sleeves 76 control the setting of the two central multiplying units and the rods 77 control the setting of the two multiplying units farthest to the right.

The manner in which the multiplying combs are set under control of the rods and sleeves is best shown in Figs. 8 and 14, where each rod 77 is shown as having an arm 78 connected thereto whose free end has connection with extension 79 of which there is one for each of these four combs in the multiplying unit being controlled. From the manner of connection, it will be apparent that the four combs of any multiplying unit so set will receive a setting which is the same as the setting of the corresponding four disks 53. To illustrate this a little more clearly, with particular reference to the code in Fig. 30, a "6" read from the hundredths order of the scale setting will position a slider 54 to position the hundreds disks 53 so that the disks B, C, and D will be displaced while the A disk is held.

This will cause rocking of the B, C, and D rods 77, which in turn will rock the B, C, and D arms 78 to displace the combs 130B, C and D in the associated multiplying unit (see Fig. 45). The configuration of the multiplying combs, the manner of their mounting, and the manner in which they control the computation of the product of the multiplicand and multiplier will be described in detail later.

Printing of the scale reading

Referring to Figs. 11, 12, 27, 52, and 55, each of the sleeves 75 and 76 and each of the rods 77 has secured thereto a depending arm 80, whose lower ends have connection with sliding combs 81. As shown in Fig. 55, three sets of combs 81 are provided, there being four combs in each set. Fig. 27 shows the left hand set of combs associated with the rods 77. In this figure the four combs are labeled A, B, C and D, to correspond to the rods 77, A, B, C and D, and it will be apparent from this figure that a combination setting of the rods 77 will effect a similar combination movement of the combs 81. Thus, if rods 77A and B are rocked, the combs 81A and B will be moved toward the left as viewed in Fig. 27. The sleeves 75 and 76 will similarly displace their associated set of combs. The function of the combs 81 is to translate the combinational setting on the sleeves back into a linear reading for the purposes of printing the reading of the scale. To this end each of the combs 81 is provided with notches 82 in their lower edges arranged in accordance with the code in Fig. 30, so that if the combs of any set are displaced relatively in accordance with such code, a line of four notches will be presented in the position corresponding to the displaced relationship of the combs (see also Fig. 28).

For example, if combs A and D are displaced to represent the figure 4, these combs will move to present a clear cut across the lower edge of the four combs in the "4" position. A type bar 83 carries a spring-pressed pawl 84 whose free end extends across the lower edge of these four combs of a set. As the type bar 83 moves toward the right, the pawl 84 will find the clear opening and will drop into it to interrupt further movement of the type bar toward the right. Each type bar (Fig. 11) is provided with an actuating spring 84a and there is a restoring bail 85. Each type bar is provided with a set of numeral type 86 which are adapted to move past the printing line in succession as the pawl 84 moves past the corresponding lines of notches in the combs 81, so that in the example supposed, when the pawl 84 drops into the line of notches corresponding to the "4" position, the type bar will be interrupted with the character "4" in position for printing.

Referring to Figs. 11 and 12, a stop lever 87 is provided, pivoted at 88, which is normally adapted to engage the forward end of the comb 81 to prevent type bar setting movement thereof. The member 37 controlled by the "scale" key 30 has connected thereto a link 89 whose lower end carries a rod 90. The operation is such that when the scale key is depressed, the rod 90 will be elevated and will rock the stop members 87 from the position of Fig. 11 to that of Fig. 12, wherein they are raised out of engagement with the ends of the combs 81, thereby permitting free movement of the latter.

Keyboard multiplicand set-up

If desired, the same set of multiplying combs which were set under control of the scale indicating drum may be positioned under control of the keyboard. For this operation, the "keyboard" key 93, Fig. 1, is depressed. In Fig. 19 depression of this key will rock an arm 94 pivoted at 95, to move a link 96 towards the left as viewed in this figure, thereby rocking an arm 97 pivoted at 98 and also rocking an arm 99 whose free end has pin and slot connection with the link 70, elevating the latter to release the disks 53. Release of the disks 53 at this time is to prevent their interference with the operation of the keyboard set-up mechanism which will now be described in detail. In Fig. 1 the two columns of numerical keys 100 on the left are allocated to the setting up of the multiplicand and the two columns of keys 101 on the right are allocated to the setting of the multiplier factor. Each of the keys 100 is suitably mounted for vertical movement and is normally adapted to be held in its upper position by a spring as shown (Fig. 31). The lower end of each key is provided with a latch 102 (Fig. 32) which is adapted to cooperate with the usual latching plate 103, pivoted at 104 in the usual manner. Depression of any key 100 will cam the latching plate 103 in a clockwise direction as viewed in Fig. 32, and the latch 102 will stand thereunder to hold the key in depressed position. Each of the keys is provided with a pair of projections 105 (Fig. 31) which cooperate with projections extending from combination bars 106, whose function is to convert the numerical key setting into the combinational arrangement in accordance with the code of Fig. 30. Four combination bars 106 are provided for each column of keys (see Fig. 35) and depression of any key 100 will permit displacement of the four bars 106 in a relationship predicated upon the arrangement of the code.

The bars 106 are separately shown in Fig. 37 and the combinational arrangement of the projections for the various digits is shown in Fig. 38. The arrangement is such that depression of a key 100 will cause the projections 105 to cooperate with the projections on the bars 106 to prevent movement toward the right of those bars which have projections in alignment with the depressed key. Each of the four bars 106 of a set is mounted in an obliquely slidable frame 108 which is urged towards the right by a suitable spring 109 (Fig. 31) and held against such movement by the cooperation of a projection 110a on the frame 108 which cooperates with a corresponding extension 110 on the latching plate 103. The action is such that as a key 100 is depressed, causing the latching plate 103 to cam away from the key, the projection 110 at one end thereof (see Fig. 33) will release the frame 108, so that it may move towards the right, carrying with it the bars 106 and the bars will move with the frame in accordance with the arrangement of the projections thereon. For example, if the number "four" key is depressed, bars 106B and C will be intercepted by the projections 105 and the other two bars A and D will be permitted to move toward the right. During the operation of the machine an arm 111 carried by shaft 38 and extending upwardly into a slot 112 in the frame 108 will move the latter downwardly towards the left to restore the bars 106 and relatch the frame 108 against the latch 103. Each of the bars 106 (Figs. 19 and 35) has pin and slot connection 113 with an arm 114 loosely pivoted on the shaft 38, the lower end of each arm 114 cooperates with a stop member 87 of which there is one for each arm and if a bar 106 is permitted to move toward the left as viewed in Fig. 19, the consequent counterclockwise rocking of the corresponding arm 114 will rock the associated stop member 87 to the position shown in Fig. 19, whereupon the corresponding comb 81 is permitted to move toward the right.

It will be apparent that the two sets of combination combs 81 corresponding to the multiplicand unit receive a combinational setting in accordance with the the value of the number set up on the keys 100, and since these combs are connected through arms 80 to the sleeves 76 and 75, the same combination setting will be transmitted to the multiplying units in the same manner as the sleeves transmitted the scale readings to the units.

It will be observed in connection with Figs. 35 and 52 that the multiplicand as set up on the keyboard is limited to two positions, namely, units and tens, and therefore only the sleeves 76 and 75 will be affected so that the units figure will be set on the two multiplier units farthest to the left and the tens digit will be set on the two central sets of multiplying units. The two sets of units farthest to the right receive no reading, of course.

A brief review will now be given of the manner in which the multiplicand is set up on combs 130 under control of either the scale setting or the multiplicand keys 100.

Under scale operation, after the article has been placed on the platform, the "scale" key 30 (Fig. 12) is depressed. This causes the scale reading to be transferred to the sliders 54 (Fig. 3). Immediately thereafter the disks 53 are released for movement into position in a combinational arrangement determined by the controlling slider 54. Operation of the "scale" key 30 has at the same time rocked all stops 87 (Fig. 12) so that, upon release of disks 53, the combs 81 may be advanced in the same combinational order as their connected disks and the associated sleeves 75, 76 and rods 77 will likewise be rocked. The sleeves and rods transmit the reading to multiplying combs 130A, B, C, and D and the combs 81 control the setting of the type bars 83 to permit printing of the decimal equivalent of the weight.

In Fig. 6 is shown a record upon which the multiplicand 3.50 has been printed in the first column and on the first line under control of a scale reading of 3 lb. 8 oz.

Under operation of multiplicand keys 100 a combinational setting is effected on bars 106 (Fig. 19) which is transferred through arms 114 to stops 87 which in turn release combs 81 in combinational arrangements corresponding to the value set on the keyboard. Depression of the "keyboard" key 93 will effect release of all the disks 53 so that they can actuate the selected combs 81. As in the case of the scale setting the reading is transmitted through sleeves 75 and 76 to the multiplying combs 130, it being observed that under scale setting, three denominational orders are involved and under key setting but two orders are utilized. It will also be apparent that the setting of the combs 81 under control of the keys will also control the positioning of the type bars to set them for printing the multiplicand as set up on the keys 100.

Keyboard multiplier setup

The multiplier is set up on the keyboard by means of keys 101 in the same manner as the multiplicand is set up on the keys 100. Referring to Figs. 8 and 14, the combination bars 106 associated with the multiplier keys 101 are provided with projections 120 which cooperate with fingers 121 carried by rods 122 and 124. The fingers 121 are held against the projections 120 by springs 123, so that as the bars move toward the right the fingers will follow and take a similar setting. The fingers 121 associated with the units order of the multiplier keys control the setting of bars 122 (see also Fig. 26), while the fingers 121 associated with the tens order of the multiplier control the setting of rods 124.

Each of the rods 122 and 124 has secured thereto a plurality of arms 125 whose free ends are connected to the right hand sets of multiplier combs in the multiplier units (see Fig. 26) where it will be observed that the rods 122, through arms 125, control the setting of the combs in the multiplying unit in the second, fourth and sixth units counting from the right, while the arms 125 associated with the rods 124 control the setting of the first, third and fifth right hand sections of such multiplying units.

The result of these aforedescribed settings of the multiplying units is diagrammatically indicated in Fig. 51, where the six units are shown in diagrammatic outline. For the purposes of illustration, the diagram is illustrated in accordance with the problem shown in Fig. 50, where the multiplicand 5.37 is to be multiplied by the key setting of 89. It will be observed in Fig. 51 that the line labelled "multiplicand" shows that the units digit has been entered into the first and second multiplying units from the left, the tens digit 3 has been entered into the two central units and the hundreds digit 5 has been entered into the two multiplying units farthest to the right. On the line labelled "multiplier" it is seen that the units digit of the multiplier is entered into the first, third and fifth units counting from the left and the tens digit 8 has been entered into the other three units. The manner in which these separate entries control the selection of partial products will be explained later.

Printing of the multiplier

The control of the multiplier printing bars is practically the same as that used to control the setting of the multiplicand printing bars. Referring to Figs. 14 and 35, the bars 106 related to the multiplier section of the keyboard have pin and slot connection with arms 127 loosely pivoted on the shaft 38, the lower ends of the arms 127 are spring urged into engagement with combination comb sliders 128 suitably mounted for horizontal movement. These combs are provided with notches arranged similarly to the notches in the combs 81 which control the setting of the multiplicand type bars (see Figs. 15–18). As the type bars 83 are moved toward the right as viewed in Fig. 14 the usual pawl 84 will traverse the lower edges of the combs 128 and find an opening in the position corresponding to the setting of the key. Printing will take place on the record (Fig. 6) as at "40" of the first line thereof.

Multiplying units

The machine is provided with six multiplying units one of which is shown in isometric in Fig. 45. Each unit comprises four combination combs 130A, 130B, 130C, and 130D which, as explained above, are positioned in accordance with the setting of the scale or the setting of the multiplicand keys. Each unit also includes a set of four combination combs 131A, 131B, 131C and 131D which are set, as explained, from the multiplier keys. These eight combs are supported by studs 132 (see also Fig. 47) which are carried by fixed members 133 and 134. The combs 130 and 131 are provided with cuts or notches upon both their inner and outer peripheries with which a number of pawls 135 are adapted to cooperate. Certain of the pawls are carried by a disk 136 and the remainder are carried by a disk 137. Specifically as shown in Fig. 45, all the pawls 135 about the outer periphery of the combs and the two pawls in dotted outline below and to the left of shaft 140, on the inner periphery, are carried by disk 137 while the remaining pawls 135 on the inner periphery are carried by the disk 136 (not shown).

The disks are adapted to move in a counterclockwise direction under the influence of springs 138 and are restrained against such movement by a bail 139 secured to shaft 140. When the bail 139 is rocked in a counterclockwise direction, the disks 136, 137 will follow under the influence of their springs 138 carrying with them the pawls 135 which thereupon slide over the inner and outer peripheries of the combs 130, 131. The arrangement of the notches in the combination combs 130, 131 is such that when they have been displaced in accordance with a particular setting an opening extending across the entire eight combs will occur at some point on the outer periphery and another opening will appear somewhere around the inner periphery so that as the disks 136, 137 are rotated, one of the pawls on the disk 136 will find the opening across all the combs on the outside and will drop therein to prevent further movement of the disk. One of the pawls on the other disk will enter the second clear opening and will prevent further movement of that disk. The distance that the disks 136 and 137 travel corresponds to the components of the product of the numbers set up on combs 130 and 131. For example, let it be assumed that combs 130A to 130D have been set to represent an "8" and the combs 131A to 131D have been set to represent a "6". The product of these two numbers, "48", will be set on the disks 136, 137, the "8" being set on disk 137 and the "4" being set on disk 136. The setting of "4" on disk 136 is attained due to the fact that the clear notch across the inner periphery of the combs occurred in such position that one of the pawls 135 carried by disk 136 dropped into this opening after the disk had moved an amount corresponding to four units.

Similarly, one of the pawls 135 carried by disk 137 dropped into the second opening after the disk had moved an amount corresponding to eight units. It may be explained that, in order to obtain a compact structure, the pawls 135 are spaced so that certain of them traverse the same peripheral section of the combs that the adjacent pawls traverse. Thus, if a clear opening occurred in such section, two pawls could drop therein after each had moved from its rest position to the position at which the opening occurred. Naturally, the first pawl to arrive at the opening would control, but this may not give the required amount of movement. Accordingly, the fixed combs 133 and 134 are provided to lock out all pawls except the one which is to take the reading. The relationship between the combs, disks, and pawls may perhaps be better understood by reference to Figs. 48 and 49. The former is a diagrammatic development of the outer periphery of the several combs and the latter is a similar development of the inner periphery. The arrangement of the notches in the combs 130A to 130D and 131A to 131D is completely shown and the relative location of the pawls 135 with respect to the notches is also indicated. The disks 136 and 137 are indicated in connection with the pawls 135 to show with which of the pawls they are associated. The members 133 and 134, spoken of as "fixed" above, are also provided with cuts or notches which cooperate with the pawls 135. As seen in Figs. 48 and 49, the member 133 cooperates with pawls 135 carried by disks 136 and 137 and the member 134 cooperates with other pawls 135 carried by disks 136 and 137. The members 133 and 134 are known as "closure combs" and prevent the effective operation of pawls 135 whenever by reason of certain combinational settings more than one clear notch is alined on either the outer or inner peripheries of the combination combs and prevents but one such opening from being effective. For example, in Fig. 48, the first and second pawls 135 from the bottom move downwardly across the same notches below the first pawl. If a clear opening were made across the combs along the line indicated "0" opposite the multiplier 1 and multiplicand 6, the first pawl would be intercepted at the "0" line. It will be noted, however, that comb 133 has no notch along this line, so that the first pawl 135 will pass over the clear opening and the second pawl will drop in after it reaches this position which is indicated by a "6" in the left hand scale and has a notch in comb 134. Wherever by reason of the combinational shifting of the combs 130, 131 a clear opening occurs in more than one position on either the outer or inner periphery, one or the other of the fixed combs 133, 134 will block out all but the proper pawls to take the readings from the proper openings.

As shown in Fig. 45, certain pawls 135 ride on the periphery of the eight central combs 130A—130D, 131A—131D, and only closure comb 134 while other combs 135 ride on the periphery of the same eight central combs and only closure comb 133. That is, comb 134 controls some of the pawls 135 and comb 133 controls the remainder. To bring out more clearly which of the pawls cooperate with each closure comb in Figs. 48 and 49, the disks 136 and 137 are represented in duplicate, one on each side of the combs with each pawl 135 extending laterally therefrom across all the combination combs and one of the closure combs. This then diagrammatically represents which pawls are controlled by comb 134 and which by comb 133.

Applying a specific example such as 8×6 to Figs. 48 and 49, it will be observed in accordance with the combinational arrangement disclosed in connection with Fig. 30 that the digit "8" is represented by the combination A and B and the combination "6" is represented by B, C, and D. Accordingly, the combs 130A, 130D, 131B, 131C, and 131D will be actuated or, as represented in the diagram of Fig. 48, moved downwardly one step, thus bringing into alinement the notches shown in solid black, in the position through which a line 141 has been drawn and also the notches shown in solid black in the position in Fig. 49 through which a line 142 has been drawn.

In the diagrammatic representation of Figs. 48 and 49, the notches in the combs are the shaded portions and the disks 136 and 137 are represented in duplicate for the sake of showing which pawls 135 cooperate with closure comb 133 and which cooperate with comb 134.

During the subsequent downward movement of disk 137, the left hand pawl 135 next above the line 141 will move downwardly a distance representative of "8" before dropping into the clear cut now presented at this point. Similarly, the pawl 135 carried by disk 136, which is the first one above the line 142, will move a distance representative of "4" before the pawl drops into the second clear opening. It will be noted that the right hand pawl 135 next above line 141 will pass over the line 141 but will not drop in since the comb 133 is not notched at this point.

In a similar manner, any pair of digits which may be set on the combination combs will control the subsequent movement of disks 136 and 137 in such manner that disk 136 will move an amount proportional to the left hand component of the product of the two digits and disk 137 will move a distance proportional to the right hand component of the product. Due to the arrangement of the cuts in the combs, occasioned by the compactness of the structure, both of the effective openings across the combs may occur on the inner periphery or one may occur on the inner and one on the outer periphery. That is, disk 137 has pawls 135 which engage both the inner and outer peripheries and disk 136 has pawls engaging only the inner periphery. In any event, one of the row of alined notches will always control the one disk while the second controls the other disk.

The scales and indicating arrows adjoining the combs in Figs. 48 and 49 indicate the distances through which the several pawls 135 may operate effectively and the multiplication chart indicates the position at which a clear opening will occur for the product indicated. Thus along lines 141 and 142 will be found the notation 8.6 (representing 8 times 6) indicating that at such point the notches will aline and the scale will indicate the distance of the clear cut from the starting position of the associated pawl 135.

The disk 136 carries a special pawl 135 split into two parts 135a and 135b (Figs. 45 and 46). The pawl 135a extends across combs 130A—130D and is secured to a rod 135c pivoted on disk 136, while pawl 135b extends across combs 131A—131D and comb 133. Referring to Fig. 49, there is a clear opening across all the combs along the line designated 142a, when the combs are in restored position and the pawls 135a and 135b are engaged in their respective sets of combs. The purpose of pawls 135a and 135b is to block disk 136 against movement when no combination combs are shifted or when combs in only the multiplier or multiplicand set are shifted. The rod 135c has secured thereto an arm 135d carrying a pin 135e which normally engages in a notch in comb 133 (Fig. 47). The action is such that, if any combs of the set 130A—130D are moved, the pawl 135a will be cammed counterclockwise (Fig. 47) to the dotted line position rocking rod 135c and lifting pin 135e out of locking engagement with comb 133. However, if a comb in the 131A—131D set is not also moved, the pawl 135b remains in the position shown so that disk 136 remains locked by virtue of the engagement of pawl 135b with comb 133. Conversely, if a comb of the 131A—131D set is moved, pawl 135b is raised out of engagement with comb 133 but, unless a comb in the 130A—130D set is also moved, pin 135e will remain in position to lock disk 136 against movement. It is thus required that a comb in each set 130A—130D and 131A—131D be moved in order to release disk 136. A similar pair of split pawls designated 135f and 135g (Fig. 45) are provided for control of disk 137 in the same manner.

In Fig. 48 the relative position of the split pawls 135f, 135g are indicated along the line designated 141a, each pawl extending across only four of the combination combs and one closure comb.

It should be mentioned that no notch aligning position is provided for any of the pawls 135 carried by the units disk 137 to limit the movement of the disk to nine steps when the units digit of a product is nine, as where the computation is 1×9, 3×3, 7×7, for example. Also no notch aligning position is provided for any pawl 135 carried by the tens disk 136 to limit the movement of that disk when the tens digit is eight for the single case of 9×9. It is apparent, of course, that in accordance with the principles involved in the arrangement described, that these positions could be taken care of in the same manner as for other digit factors. In the present structure, however, the arrangement is such that the movement of bail 139 (Figs. 8 and 45) which permits the disks 136 and 137 to advance, will of itself, when at the limit of its forward movement, provide the stopping position for units disk 137 with a nine step displacement and the stopping position for the tens disk 136 with an eight step displacement provided the disks have not been interrupted at some intermediate position by an aligned set of notches in the combs.

Referring now to Fig. 51, the six pairs of disks 136, 137 are diagrammatically shown for the six multiplying units.

The boxes shown at the upper part of the drawing indicate the values set on the pairs of disks. In the first pair on the left it will be recalled that a "7" had been entered as the multiplicand and a "9" as the multiplier. The resulting product, "63" is now set on the disks 136, 137 under control of the combination combs in the manner just described. The other products, namely 56, 27, 24, 45 and 40, are also indicated as having their left hand components set on the respective disks 136 and the right hand components set on the respective disks 137.

Integrating mechanism

The integrating mechanism has a plurality of different accumulating means for accumulating the partial products of different orders, the accumulating means for accumulating tens being shown in Figs. 39 and 43.

The mathematical relationship between the various values set on the disks 136, 137 is indicated in Fig. 50 where the vertical columns indicate those partial products which are to be accumulated or integrated to form the complete product. Thus, in the first column, the "4" is the highest denominational order figure, the "7" represented by the sum of 4, 2 and 1 carried from the next lower order which in turn is the sum of the digits in that column plus "1" carried from the next order. The accumulating of the several digits from the disks 136, 137 is effected in the same order as their accumulation indicated in Fig. 50. Thus, as shown in Fig. 51, the line 143 indicates that the "7" and two "6's" are to be assembled; line 144 indicates that the two "5's" "4", "2" and "1" carried from another column are to be assembled; line 145 indicates the accumulation of "4", "2" and the carried "1"; and line 146 indicates that the "4" has no carry associated therewith.

The integrating mechanism will now be explained in detail, with particular reference to the accumulation of the digits connected by line 144.

As will be seen in Fig. 51, the "5" digit to the right is set on a disk 137 which carries the right hand component of the product 45. The "4" is set on a disk 137, this being the right hand component of the product "24". The "2" is set on a disk 136 and is the left hand component of the product 27. The second "5" is set on a disk 136 and is the left hand component of the product "56". These four disks 136 and 137 are shown in Fig. 43 in expanded isometric and in their normal or home position. Each of the disks carries a roller 147 which cooperates with a cam edge 148 carried by a member 149 pivoted at 150 to a member 151 loosely pivoted on the shaft 140. The cam surface 148 is normally urged against the roller 147 by a spring 152 connected between member 149 and member 151. As the disks 136, 137 are moved in a clockwise direction under the influence of their springs 138 to take the readings from the combination combs, the rollers 147 cooperate with the cam surfaces 148 to rock members 149 in a counterclockwise direction. The members 149 are provided with steps 153 which cooperate with projections 154 carried by arms 155. The arrangement is such that with a "1" set on a disk, projection 154 will be permitted to move downwardly one step to the next step 153, the number of steps that projection 154 may advance depending upon the setting of the associated disk. The first arm 155 toward the right in Fig. 43 is adjacent to an arm 156 which is connected to a gear 157. After the disks 136, 137 have been positioned and the members 149 correspondingly rocked to assume related positions, the gear 157 is permitted to rotate in a clockwise direction and a projection 158 on arm 156 will engage arm 155.

The distance that gear 157 will move after the projection 158 engages arm 155 will be determined by the setting of the several members 149. Since the member 149 farthest to the right in Fig. 43 has been rocked to receive the value "5" (see also Fig. 44) in accordance with the example being traced, the arm 155 may move five steps to contact with the "5" step 153. The arm 151 to which member 149 is pivoted is connected through a cross bar 159 with arm 155a which cooperates with member 149a (suffixed letters are used to distinguish the orders). This member has been rocked to represent a "4" so that after the arm 155 engages the "5" step 153 of member 149, the gear 157 will continue to move, moving with it the arm 155, member 149 and arm 151 which will consequently also rock the arm 155a through four steps of movement before it engages the "4" step 153a of the member 149a. The arm 151a which carries the member 149a is in turn integrally associated with the arm 155b through a connecting rod 160 and as the gear 157 continues its rotation carrying therewith the arms 151 and 151a, the arm 155b will move therewith until it engages the "2" step 153b of member 149b. This member is pivoted to arm 151b having cross bar 161 connecting it to arm 155c which thereupon moves with the gear 157 through five steps where it will engage the "5" step 153c of member 149c. Thus far the gear 157 has advanced an effective distance equal to the sum of the settings of the members 149, 149a, 149b, and 149c; that is, it has moved through sixteen steps and the position of the parts at this time is as indicated in Fig. 44 where the parts are shown in their moved position.

Carrying mechanism

In accordance with the example being traced, it is necessary to add one additional digit to the sixteen already accumulated by the gear 157. This extra digit is to be carried from the next lower denominational order.

Referring now to Figs. 39, 41, and 42, the next lower denominational order gear is indicated at 162 and this gear has accumulated the sum of "6", "6", and "7" represented by line 143 in Fig. 51. The sum of these digits equals "19" and it is the "1" which is to be carried into gear 157. Gear 162 has riveted thereto a stepped cam track 163 which is adapted to cooperate with a roller 164 carried by an arm 165 pivoted at 165a and spring-urged into engagement with cam 163. During the interval that the gear 162 turns in a clockwise direction to receive an entry of "10" and also while it is turning through the aforementioned lost motion period, the roller 164 rides on the section of greatest radius of cam 163. As the gear 162 receives entries from "10" to "19" the roller rides on the section of next lesser radius and when gear 162 receives entries from "20" to "29" the roller rides on the next section. The arm 165 carries a pin 166 extending laterally therefrom and lying in the plane of arm 151c whose lower end is provided with several steps 167 which are adapted to cooperate with the pin 166 and allow the arm 151c to move one step in a clockwise direction if the entry on gear 162 lies between "10" and "19" and to allow it two steps if the entry lies between "20" and "29". If an entry of less than "10" is made on gear 162 the parts will be in the position shown in Fig. 41 where no movement of arm 151c is permitted.

Returning then to Figs. 43 and 44, the pin 166 will occupy a position in relation to steps 167 as shown so that after the gear 157 has advanced sixteen steps, it will move one additional step to include the carried "1" in the accumulation.

Each of the other columns of digits in Fig. 50 is accumulated in the same fashion and through similar mechanism. The detailed description of each mechanism is omitted since it would be merely a repetition of the foregoing accumulation on gear 157.

At the termination of the several accumulations, the gears will have entered thereon amounts as represented at the bottom of Fig. 51; that is, gear 162 will have an entry of "9"; gear 157, "7"; gear 168, "7"; and gear 169, "4". No gear is provided to receive the lowest order digit "3" although this could readily be provided, if desired.

Operating mechanism

Figure 7:
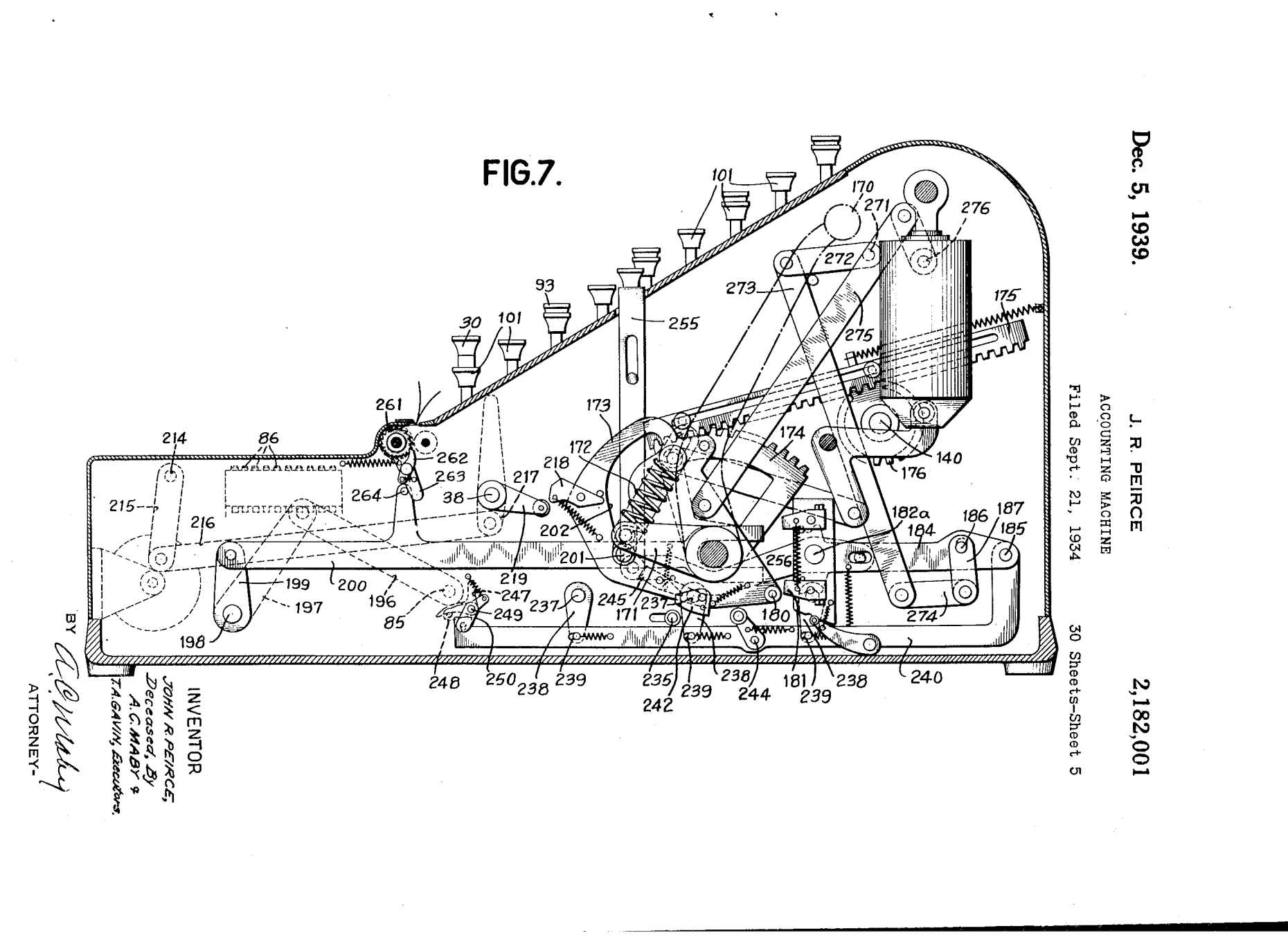

Referring now to Fig. 7, the operating handle 170 is normally in the position shown and after the operator has set the multiplier and multiplicand factors of the multiplication on the keys or placed the article on the scale and set the multiplier factor on the keys, the handle 170 is then moved in a counterclockwise direction through substantially 60 degrees. The handle 170 is integral with an arm 171 which is connected through a driving spring 172 with a cam member 173. This member has integral therewith the gear sector 174 which meshes with a rack 175 which is in engagement with a gear 176 secured upon multiplying unit shaft 140. The rocking of handle 170 through its full movement will, through the connections just traced, rotate the shaft 140 through substantially 180 degrees. As explained above, the operating bail 139 (Fig. 8) is carried by the shaft 140 and rotates therewith to permit the pawls 15 to take a reading from the combination combs.

Bail 139 also permits the rotation of the gears 162, 157, 168, and 169 so they may be turned in an accumulating direction by pinions 177 carried on a rod 178 (Fig. 41). The pinions are driven by springs 179, one end of each of which is secured to the rod 178 and the other end is secured to the pinion 177.

During the return stroke of handle 170, the bail 139 will engage the supporting spokes of the several disks 136 and 137 and also of the gears to restore them to home position. The restoration of the gears will, of course, turn the pinions 177 to wind up the springs 179, thus storing energy for the next accumulating operation.

Printing of the product

It remains now to transfer the setting of the accumulating gears to the printing devices and this is effected in the following manner: The cam member 173 (Figs. 20 and 53) which is rocked by the operating handle, carries a roller 180 which is adapted to engage a latch 181 carried by a member 182. The member 182 is mounted for oscillation at 182a and carries a pin 183 which engages in a bifurcation in a T-shaped member 184 which is pivoted at 185 so that when the roller 180 strikes 181, the member 182 will be rocked in a counterclockwise direction and the pin 183 will cause the member 184 to move toward the right with the pin. The member 184 has pin and slot connection 186 with an arm 187 secured to a rod 188. The rod 188 carries four arms 189 (see also Figs. 8, 34 and 41) which at their free ends carry pinions 190 which are adapted to mesh with the gears 162, 157, 168, and 169. The timing is such that the pinions 190 engage their respective gears before the latter begin to rotate to accumulate the partial products. It will thus be apparent that the distance which each gear travels will be represented on its pinion 190. Thus, if a value of "17" is added on gear 157, as explained above, the corresponding pinion 190 will be rotated through seventeen steps. This is the equivalent of one and seven-tenths revolutions of the pinion 190.

At the commencement of the return stroke of handle 170, the roller 180 will engage the upper latch 181a carried by member 182 causing the latter to rock in a clockwise direction and through pin 183, draw member 184 toward the left and consequently cause the rocking of rod 188 in a counterclockwise direction and the withdrawal of transfer pinions 190 from engagement with their gears. The pinions will have been set in accordance with the units values of the setting on the gears and with such setting, their downward movement at this time will bring them into engagement with racks 191 carried by bars 192 (Fig. 8). After this engagement, the bars 192 and their racks 191 are moved toward the right to take the reading from pinions 190. Connected to each pinion is a stop pin 192a which is adapted to cooperate with a fixed stop 193 (see also Fig. 34) when the pinion is in its lowered position. It will, of course, be understood that the entry of a number on the pinion 190 is represented by the displacement of the pin 192a with respect to the stop 193 so that the pinion having a "7" entered thereon will have its pin 192a positioned seven steps in a clockwise direction away from stop 193 so that as the rack 191 rotates the pinion, the latter will engage the stop 193 after the rack has been permitted to advance seven steps.

The bars 192 are connected by suitable cross members 194 (see Figs. 8, 25 and 34) to type bars 195 to place the reading of the transfer wheels on the proper denominational order type bars. It will be noted that as viewed from the front of the machine, the product "4779" (see Fig. 51) is accumulated on the gears 162, 157, 168 and 169, in inverted order and it is necessary to transpose the connections between the racks 191 and the type bars 195 for printing in proper order.

The type bars, as explained above, are controlled in their movement by bail 85 (Fig. 8) which is suitably guided for horizontal movement and is connected through a link 196 to an arm 197 carried by a shaft 198.

Referring to Fig. 7, the shaft 198 has secured thereto an arm 199 which has connection with a link 200 whose free end is bifurcated to straddle the pivot stud of handle 170. Link 200 is provided with a pin 201 riding in cam slot 202 of the cam member 173. The conformation of slot 202 is such that the bail 85 and consequently the type bars are moved toward the left as the transfer pinions are in engagement with the accumulating gears and that the type bars take their reading from the pinions as they move toward the right during the return stroke of handle 170. Each type bar is provided with a spring 203 for moving it toward the right.

Beneath the type elements 86 of each of the type bars is located a printing hammer 204 (Figs. 8 and 9) pivoted on a rod 205 and cooperating with each hammer is a member 206 which is adapted to cooperate with a rod 207 carried by the arm 197. The hammer 204 is spring-pressed against a pin 208 in member 206 which member has a projection 209 adapted to be engaged by a hook 210 when the member is rocked in a clockwise direction by the rod 207 during the restoring movement of the type bars. In engagement with the head of each type bar is a latch 211 pivoted at 212 upon an arm 213 and adapted to engage the hook 210. When any type bar is in zero printing position, its latch 211 is held out of engagement with the hook 210. In other positions, the latch takes a position as indicated in Fig. 9 with the latch in engagement with the latch on hook 210. The arms 213 are carried by shaft 214 which, as seen in Fig. 7, has secured thereto an arm 215 connected by a link 216 to an arm 217 secured upon rod 38.

Actuation of rod 38 is effected by a spring-pressed latch 218 carried by cam member 173. The latch is adapted to engage a roller carried by an arm 219 secured to shaft 38 toward the end of the return movement of handle 170 causing the shaft 214 to be rocked in a counterclockwise direction to rock arms 213 and latches 211 so that those which are in engagement with hooks 210 will rock the latter in a counterclockwise direction, thus releasing projections 209 and permitting members 206 and their associated hammers 204 to swing against the type elements under control of springs 220 to effect printing. As usual in this type of construction, the hooks 210 are provided with lateral projections 221 extending to the next lower denominational order hook 210 so that if the lower order hook is not connected for printing action, it will be tripped by the higher order hook to print a zero.

*Accumulating successively printed products*

In order to summarize the transactions as they are recorded on the machine, several accumulating units are provided. These are shown in Figs. 8, 34, and 56 and are generally designated as CU, CA, and CR and they are employed to accumulate customer's totals, cash totals, and credit totals, respectively. Accumulator CU is employed to summarize the transactions relating to the several items which may be purchased by a single customer. The accumulator CA will record all cash transactions and the accumulator CR will record all credit transactions.

Referring to Figs. 1, 11, and 56, three keys 222 are provided, one labelled "Customer", the second "Credit" and the third "Cash". Where a single item only is purchased by a customer, the operator will depress either of the keys "Cash" or "Credit" as the case may be. If more than one item is to be recorded on the sales slip, the "Customer's" key will also be depressed together with one of the "Cash" or "Credit" keys. Each of the keys cooperates with a separate bar 223 which is permitted to move obliquely toward the right as viewed in Figs. 11 and 56 and will rock therewith a bell crank shaped member 224 (see also Fig. 35) whose depending arm is in engagement with a comb 225 suitably mounted for horizontal movement.

Referring to Fig. 57, the three combs 225, 225a and 225b corresponding to the three keys "Cash", "Credit", and "Customer" respectively are provided with notches 226 which control the positioning of a pawl 227 carried by the accumulator selector bar 228. After the keys 222 have been set and latched in the usual manner, causing the displacement of one or more of the combs 225, the selector bar 228 is adapted to be moved toward the right during the subsequent operation of the machine and the distance it is permitted to move would depend upon the setting of the combs 225. If none of the combs have advanced, the pawl 227 will drop into the row of notches farthest to the left as viewed in Fig. 57, thus preventing any appreciable movement of selector bar 228 toward the right. An inspection of the arrangement of the notches or cuts 226 will disclose that pawl 227 will advance one step when combs 225a and 225b have advanced a distance indicated at 229. The pawl will advance two steps when combs 225 and 225b have advanced one step. The pawl will advance three steps if comb 225a moves forward and the pawl will advance four steps if the comb 225 moves forward.

Each of the accumulators is carried by a pair of arms 230, the forward one of which has a laterally extending projection 231 which is adapted to cooperate with notches 232 in the upper edge of the selector bar 228. The notches are so arranged that when the selector bar moves forward one step, accumulators CU and CR are permitted to rock downwardly into operating position. Two steps of advance permit accumulators CU and CA to drop. Three steps permits only accumulator CR to drop and four steps permits only accumulator CA to drop, while if the bar 228 does not advance, accumulator CU alone will drop. The lower edge of bar 228 is provided with notches 233 into which a detenting arm 234 is adapted to fit to lock the bar in its several positions. The bar is also provided with a pin 235 (Fig. 34) by means of which it is restored toward the left and a spring 236 for causing movement of the bar toward the right.

Referring now to Figs. 7, 20 and 53, the pivot shafts 237 of the accumulator units have secured at their outer ends arms 238 whose free ends have pin and slot connections 239 with a sliding bar 240 which has connection at 185 with the aforedescribed member 184. When bar 240 moves toward the left it will rock the several shafts 237 in a clockwise direction to raise the accumulators to inoperative position. When the bar 240 moves toward the right, however, the springs 241 will tend to rock the shafts 237 in a counterclockwise direction and will likewise rock the accumulators which are permitted to descend under control of the selector bar 228. Generally speaking then, the keys 222 determine which of the accumulators are to be selected for operation and the bar 240 will determine the time of selection. As explained hereinbefore, the pivot point 185 of bar 240 is moved toward the right at the commencement of the forward movement of handle 170 or in other words, just prior to the integration of the values set on the multiplying units.

The consequent movement of bar 240 toward the right will tend to rock the accumulators downwardly but such action will not take place for the CA and CR accumulators at this time since the selector bar 228 is locked by the detent 234. During the return stroke of handle 170, the bar 240, as explained above, is again shifted toward the left and the type bars move toward the right to take a reading from the transfer pinions 190 and toward the end of the cycle a spring-pressed shoe 242 carried by the cam member 173 will engage a roller on arm 243 mounted on rod 244, which rod carries the detenting pawl 234 (Fig. 56), thus moving the pawl out of engagement with the notches 233 in the selector bar 228. While the shoe 242 continues to hold arm 243 depressed, a spring-pressed latch 245 also carried by cam member 173 will engage pin 235 in bar 228 and move it to its extreme left hand position.

The timing of the parts is such that the pawl 245 will release pin 235 while shoe 242 continues to hold the detenting pawl 234 down. Upon release of pin 235, the selector bar will move to the right under the influence of its spring 236 to one of its four positions determined by the setting of the combs 225. Upon the subsequent release of arm 243 by the shoe 242, the determining arm 234 will swing upwardly to engage one of the notches 233 and hold the selector bar in its displaced position so that during the next operation of the machine, the selected accumulator or accumulators will be permitted to rock in a counterclockwise direction to receive an entry from the type bars with which they cooperate and which are now in printing position.

Each of the six type bars which print the product is provided with teeth 246 (Fig. 8) which cooperate with spring-pressed detenting pawls 247. A bail 248 is provided, carried by rod 249, which at its outer end, as seen in Fig. 7, has secured thereto an arm 250 which has pin and slot connection with the bar 240.

The purpose of the pawls 247 is to hold the type bars in their displaced position until the selected accumulators have been rocked into cooperation therewith during the next cycle since it will be recalled that at the beginning of the following cycle the transfer pinions 190 are rocked upwardly out of engagement with the right hand ends of the type bars which would then move toward their extreme right hand position when so released.

Each of the six type bars under consideration is provided with slidably mounted racks 251 (Fig. 8) there being a rack for each accumulator. During the next operation when the handle 170 is again moved forward, the accumulator wheels of the selected accumulator will be rocked downwardly into engagement with the teeth of its associated rack and as the type bars are restored toward the left, the setting thereof will be entered into the meshing accumulator wheels and, as already explained, the accumulators are raised out of engagement with the type bars before the latter again move toward the right. The accumulators themselves are of a well-known type of construction, comprising accumulator gears 252, zero stops 253, and transferring arms 254 which permit the usual transferring operation between the denominational orders of the accumulators. Accumulators of this type are more fully shown in Peirce Patents Nos. 1,248,902, 1,623,204, 1,867,027, and 1,946,915.

*Customer's-total printing operation*

After a series of transactions for a single customer have been recorded on the sales slip, the total thereof will have been accumulated in the CU accumulator and it is desirable to print this total on the record sheet and at the same time clear the CU accumulator without disturbing the entries in the CR and CA accumulators.

To this end a total key 255 (Figs. 7 and 20) is provided which is to be held depressed during the total printing operation. The key is mounted for vertical movement and is pivoted at its lower end to a lever 256 pivoted at 182a and having pin and slot connection at 257 with the T-shaped member 184. Depression of key 255 will rock the member 184 about its pivot 185 so that its upper bifurcated arm engages the pin 183a in member 182. This will cause reversal of the time of operation of the accumulator controlling mechanism so that at the beginning of the forward movement of handle 170, the roller 180 on engagement with latch 181 will move member 184 toward the left and also move the bar 240 in the same direction, causing the accumulators to be held in their upper position as the type bars are restored toward the left. Upon the return stroke of handle 170, the roller 180 will engage the upper latch 181a, causing movement of member 184 and bar 240 toward the right and since for this operation none of the keys 222 are depressed, the accumulator CU will be permitted to rock downwardly into engagement with the racks 251 on the type bars. The subsequent movement of the type bars toward the right will therefore be under control of the accumulator wheels 252 of the CU accumulator and they will permit movement of the bars in such direction until they are returned to zero position against the stops 253. The reading of the accumulator will thus be transferred to the type bars which will be caused to print that total upon the record sheet. Release of the total key at this time will permit the disengagement of the accumulator at the commencement of the next operation of the machine in restored or zeroized condition.

At the end of a day or any other period, the amounts contained in the accumulators CR and CA may also be separately printed under control of these accumulators upon depression of their associated keys 222 during a total printing operation. It is thus possible to separately totalize the amounts to be entered on a single bill in the CU accumulator and to print the total thereof upon the completion of the entry of items on that bill, these items being at the same time entered into one of the other of the accumulator CR or CA and the amounts in the latter accumulators may be read out at any convenient time to determine the total of the credit transactions and the total of the cash transactions.

Paper spacing mechanism

Referring to Fig. 8, the paper feed roller 258 which serves to advance the bill 259 and a carbonized duplicate 260 is provided with a ratchet 261 (Fig. 7) at one end with which a pawl 262 carried by an arm 263 is adapted to cooperate. Connecting link 200 carries a pin 264 which is adapted to engage the arm 263 at the proper time in the cycle of operations to advance the roller 258 the required amount.

Fig. 6 shows a bill on which the first item is the result of the multiplication of the scale setting and the key setting and the remaining items are the results of key settings only, the total 231 being printed during a total taking or total printing operation.

Customer's indicating wheels

Mechanism is provided for indicating to the customer the successive products for the various commodities purchased as they are printed on the record sheet. This indicating device comprises four indicating wheels 266 mounted upon a rod 267 (see Figs. 8, 20, and 36). The operation of the four wheels is identical so that explanation of the operation of one will serve to explain the operation of the remainder.

Each wheel 266 is integral with a pinion 268 which is adapted to be set under control of a transfer gear 269 carried by an arm 270, mounted upon a rod 271. Secured to rod 271 is an arm 272 having link connection 273 with an arm 274 carried by rod 188. As explained before, the rod 188 controls the operation of the transfer pinions 190 and the operation is such that as the pinions 190 are rocked into engagement with the accumulating gears 162, 157, 168, and 169, the transfer gears 269 will also be rocked downwardly into engagement with these gears and will receive a similar setting therefrom. During the forward stroke of the handle 170 a link 275 connected at 267 to cam member 173 is moved downwardly in an oblique direction to rock a shaft 276 in a counterclockwise direction. Carried by shaft 276 is a bail 278 which engages toothed members 277 which are in engagement with gears 268 and the operation is such that the gears 268 are rotated in the counterclockwise direction while the transfer gears 269 are in engagement with the multiplying gears. This action serves to bring the wheels 266 to a zero reading position.

At the commencement of the return stroke of handle 170, gears 269 are thrown out of engagement with the multiplying gears and into mesh with the gears 268 so that as the bail 278 is rocked in a clockwise direction, springs 279 cause the gears 268 to rotate in a clockwise direction to take the reading from transfer gears 269, the latter being interrupted in their movement when projections 280 thereon come into engagement with fixed stopping arms 281. The reading on the wheels 266 will then indicate to the customer through a suitable opening in the casing, the product of the weight of the article upon the scale platform and the unit price or the product of the number of articles and the unit price as the case may be.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a multiplying mechanism, a plurality of shiftable multiplying elements having notches therein, means for positioning one or more of said elements to represent one factor, means for positioning one or more other of said elements to represent another factor, whereby there will be an alignment of the notches in all of said elements in one or more positions representative of the components of the product of said factors, means for ascertaining one of the positions at which said aligned notches have occurred and means controlled thereby to receive said product.

2. The invention set forth in claim 4 in which the shifting is the same extent for each element moved.

3. In a machine of the class described, a multiplying mechanism comprising a plurality of sets of multiplying rings, means for effecting a combinational shifting of one or more rings a like distance, a corresponding number of rotatable read-out devices, rotatable integrating mechanism; said rings, read-out devices and integrating mechanism being mounted on a common axis, and means for concurrently rotating said read-out devices and said integrating mechanism to obtain the product represented by said relative shifting on said multiplying rings.

4. In a multiplying machine, a plurality of sets of multiplying elements, multiplicand keys and means controlled thereby for causing shifting of certain of the elements of each set, multiplier keys and means controlled thereby for causing shifting of certain other of the elements of each set, each set being adapted, upon said shifting of the elements, to represent the components of the products of two digits, readout means for each set of elements including mechanical feeler devices adapted to engage with all of the elements of the related set to readout the components of the product represented thereon and integrating means for gathering together certain components of the products as they are read out of said sets of elements.

5. In a calculating machine, a plurality of sets of multiplying rings, the rings of each set being relatively shiftable in combinational arrangement with respect to one another to represent by their relative displacement two digits, means for effecting said combinational shifting of said rings, the rings of each set having notches arranged to be aligned in a position relative to a fixed point, upon the shifting of the rings, to represent the components of the products of the digits in accordance with which the rings are shifted, read-out means for each set of rings for ascertaining the position of alignment of said notches and for representing the components of the products and integrating means for gathering together said components of the products as they are read out of said sets of multiplying rings.

6. In a multiplying machine, a plurality of sets of multiplying elements, keys and means controlled thereby for causing relative, equidistant shifting in combinational code arrangement of the elements of each set with respect to one another to represent by their relative displacement two digits, the elements of each set having notches arranged to be aligned, in a position relative to a fixed point, upon the shifting of the elements, to represent the components of the products of the digits in accordance with which the elements are shifted, read-out means for each set of elements for ascertaining the position of alignment of said notches and for representing the components of the products and integrating means for gathering together said components of the products as they are read out of said sets of elements.

7. In a multiplying machine, a plurality of sets of combinational multiplying elements, means for entering a multiplier and a multiplicand digit in each set, comprising means for shifting one or more elements in each set a like distance, each set having markings arranged to be aligned in positions relative to a fixed point upon said shifting of the elements, said positions of alignment representing the components of the product of two digits, read-out means for concurrently determining the values of the components, and integrating mechanism controlled thereby for concurrently adding a component of one set to a component of each of the other sets of elements.

8. In a multiplying machine, a plurality of sets of combinational multiplying elements, means for entering a multiplier and a multiplicand digit in each set, comprising means for shifting one or more elements in each set a like distance, each set having markings arranged to be aligned in positions relative to a fixed point upon said shifting of the elements, said positions of alignment representing the components of the product of two digits, read-out means for determining the values of the components, integrating mechanism controlled thereby, an accumulator, and means controlled by said integrating mechanism for entering the product of all the multiplicand digits times all the multiplier digits into said accumulator.

9. In a multiplying machine, a plurality of sets of combinational multiplying elements, means for entering a multiplier and a multiplicand digit in each set, comprising means for shifting one or more elements in each set a like distance, each set having markings arranged to be aligned in positions relative to a fixed point upon said shifting of the elements, said positions of alignment representing the components of the product of two digits and each set being allocated to a different denominational order, integrating mechanism arranged in orders, each order being associated with the orders of the multiplying sets related to the same denominational order of the final product, means controlled by the like orders of each set of multiplying elements for controlling the related order of said integrating mechanism in accordance with the points of alignment of said like orders of multiplying elements, and means associated with each of the lower orders of the integrating mechanism for controlling a part of the next higher orders.

10. In a multiplying machine, a plurality of sets of combinational multiplying elements, means for entering a multiplier and a multiplicand digit in each set, comprising means for shifting one or more elements in each set a like distance, each set having markings arranged to be aligned in positions relative to a fixed point upon said shifting of the elements, said positions of alignment representing the components of the product of two digits and each set being allocated to a different denominational order, integrating mechanism arranged in orders, each order being associated with the orders of the multiplying sets related to the same denominational order of the final product, means controlled by the like orders of each set of multiplying elements for controlling the related order of said integrating mechanism in accordance with the points of alignment of said like orders of multiplying elements, and camming elements associated with each of the lower orders of the integrating mechanism for effecting carrying into the next higher order.

11. In a multiplying mechanism, a plurality of multiplying elements, means for positioning one or more of said elements to represent one factor, means for positioning one or more other of said elements to represent another factor, said elements having means arranged to be aligned relative to a fixed point upon the positioning of said elements, to represent the components of the products of the factors in accordance with which the elements are positioned, means for sensing predetermined portions of all said elements after displacement to determine the position of said aligned means and to read therefrom the components of the product of said factors and means controlled thereby to receive said components of the products.

ADELBERT C. MABY,
THOMAS A. GAVIN.
*Joint Executors of the Estate of John R. Peirce, Deceased.*